(12) United States Patent
Murabayashi et al.

(10) Patent No.: US 8,325,803 B2
(45) Date of Patent: Dec. 4, 2012

(54) SIGNAL PROCESSING APPARATUS, SIGNAL PROCESSING METHOD, AND PROGRAM

(75) Inventors: Noboru Murabayashi, Saitama (JP); Hiroshige Okamoto, Kanagawa (JP); Sho Murakoshi, Tokyo (JP); Masaru Miyamoto, Tokyo (JP); Tsutomu Seki, Chiba (JP)

(73) Assignee: Sony Corporation (JP)

( * ) Notice: Subject to any disclaimer, the term of this patent is extended or adjusted under 35 U.S.C. 154(b) by 1031 days.

(21) Appl. No.: 12/283,937

(22) Filed: Sep. 17, 2008

(65) Prior Publication Data

US 2009/0080868 A1    Mar. 26, 2009

(30) Foreign Application Priority Data

Sep. 21, 2007  (JP) ................................ P2007-245570

(51) Int. Cl.
*H04N 7/18* (2006.01)
(52) U.S. Cl. ................ 375/240.08; 375/240.26
(58) Field of Classification Search . 375/240.01–240.29
See application file for complete search history.

(56) References Cited

U.S. PATENT DOCUMENTS

2009/0274436 A1* 11/2009 Lynch ........................ 382/165

FOREIGN PATENT DOCUMENTS

| JP | 2001-024980 A | 1/2001 |
| JP | 2003-283993 A | 10/2003 |
| JP | 2004-282318 A | 10/2004 |
| JP | 2006-054622 A | 2/2006 |
| WO | 2007-046171 A1 | 4/2007 |

* cited by examiner

*Primary Examiner* — Andy Rao
(74) *Attorney, Agent, or Firm* — Lerner, David, Littenberg, Krumholz & Mentlik, LLP

(57) ABSTRACT

Disclosed herein is a signal processing apparatus including a first feature detection unit configured to detect a plurality of first feature data each representing a different feature from video and audio signals of a content; a setting unit configured to set a weight for each of the plurality of first feature data detected by the first feature detection unit, the weight corresponding to the feature for detecting data on the basis of said first feature data, the weight being varied either from one content to another or from one content genre to another; and a second feature detection unit configured to detect a plurality of second feature data each representing a different feature on the basis of the plurality of first feature data for which the weights have been set by the setting unit.

7 Claims, 35 Drawing Sheets

FIG. 23

| DETECTION SECTION | HISTOGRAM DATA |
|---|---|
| CM DETECTION SECTION | NUMBER OF CM'S DETECTED PER UNIT TIME (E.G, 5 MIN) |
| SIMILAR IMAGE DETECTION SECTION | NUMBER OF FRAMES OR LENGTH OF TIME IN WHICH SIMILAR IMAGES CONTINUED PER UNIT TIME (E.G, 1 MIN) |
| FACE DETECTION SECTION | NUMBER OF FRAMES OR LENGTH OF TIME IN WHICH FACES CONTINUED PER UNIT TIME (E.G, 1 MIN) |
| HIGHLIGHT SEGMENT DETECTION SECTION | LENGTH OF TIME OF HIGHLIGHT SEGMENT PER UNIT TIME (E.G, 1 MIN) |
| PEOPLE DETECTION SECTION | NUMBER OF FRAMES OR LENGTH OF TIME IN WHICH FACES CONTINUED PER UNIT TIME (E.G, 1 MIN) |

FIG. 24

| HISTOGRAM LEVEL | RANGE OF DATA FROM VARIOUS DETECTION SECTIONS (PER UNIT MEASURING TIME) | | | | |
| --- | --- | --- | --- | --- | --- |
| | CM DETECTION SECTION (DETECTED CM COUNT) | SIMILAR IMAGE DETECTION SECTION (sec) | FACE DETECTION SECTION (DETECTION TIME (sec)) | HIGHLIGHT DETECTION SECTION (DETECTION TIME (sec)) | PEOPLE DETECTION SECTION (DETECTION TIME (sec)) |
| 1 | 0–1 | 0–9 | 0–9 | 0–9 | 0–9 |
| 2 | 2–4 | 10–19 | 10–19 | 10–19 | 10–19 |
| 3 | 5–7 | 20–29 | 20–29 | 20–29 | 20–29 |
| 4 | 8–9 | 30–39 | 30–39 | 30–39 | 30–39 |
| 5 | 10 OR MORE | 40 OR MORE | 40 OR MORE | 40 OR MORE | 40 OR MORE |

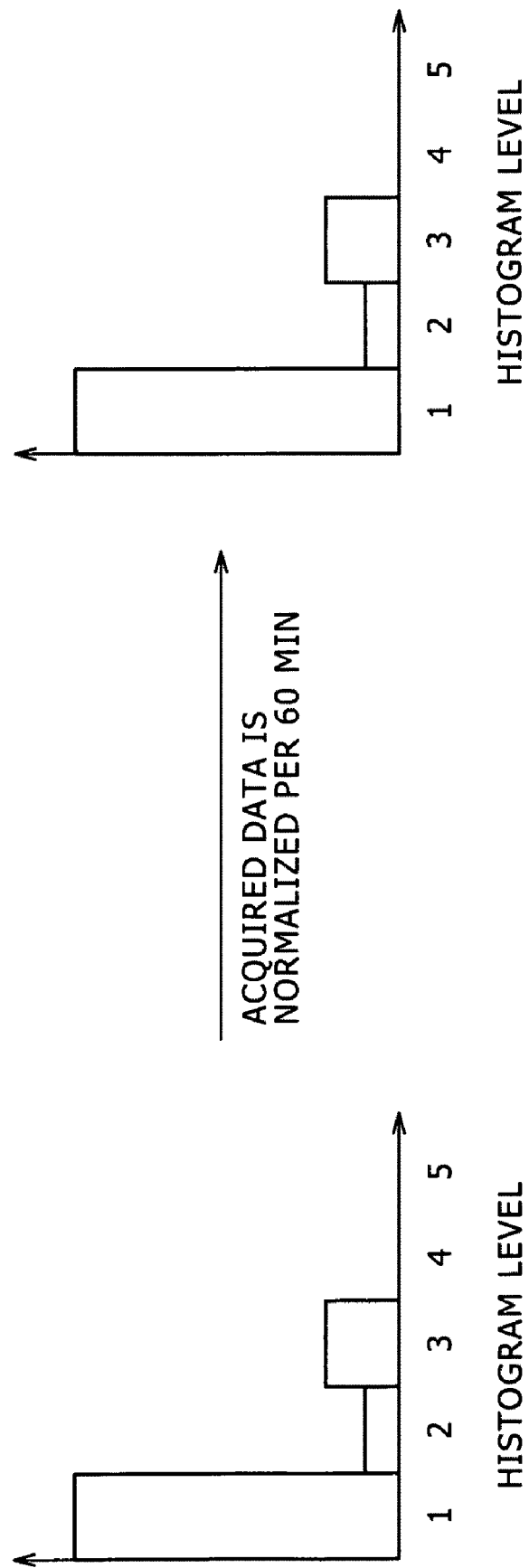

FIG. 26

| OPERATION MODE | AUTOMATIC CHAPTER CREATION MODE | | LABEL IMAGE CREATION MODE | | DIGEST REPRODUCTION MODE (SHORT-TIME REPRODUCTION MODE) | | AUTOMATIC EDITING MODE | |
|---|---|---|---|---|---|---|---|---|
| | HIGHLIGHT CHAPTER | EQUIDISTANT CHAPTER | KEY FRAME IMAGE LABEL | NORMAL LABEL | KEY FRAME DETECTION AND REPRODUCTION | SIMPLE SKIP REPRODUCTION | AUTOMATIC EDITING | MANUAL EDITING |
| CM DETECTION SECTION | 70% OR LESS OF ALL DATA HAS AT LEAST HISTOGRAM LEVEL 3 | REGARDLESS OF DATA (DITTO) | 70% OR LESS OF ALL DATA HAS AT LEAST HISTOGRAM LEVEL 3 | REGARDLESS OF DATA (DITTO) | 70% OR LESS OF ALL DATA HAS AT LEAST HISTOGRAM LEVEL 3 | REGARDLESS OF DATA (DITTO) | 70% OR LESS OF ALL DATA HAS AT LEAST HISTOGRAM LEVEL 3 | REGARDLESS OF DATA (DITTO) |
| SIMILAR IMAGE DETECTION SECTION | | | | | | | AT LEAST 30% OF ALL DATA HAS AT LEAST HISTOGRAM LEVEL 4 | |
| FACE DETECTION SECTION | | | AT LEAST 30% OF ALL DATA HAS AT LEAST HISTOGRAM LEVEL 4 | | | | | |
| HIGHLIGHT SEGMENT DETECTION SECTION | AT LEAST 30% OF ALL DATA HAS AT LEAST HISTOGRAM LEVEL 3 | | AT LEAST 30% OF ALL DATA HAS AT LEAST HISTOGRAM LEVEL 3 | | AT LEAST 30% OF ALL DATA HAS AT LEAST HISTOGRAM LEVEL 4 | | AT LEAST 30% OF ALL DATA HAS AT LEAST HISTOGRAM LEVEL 3 | |
| PEOPLE DETECTION SECTION | AT LEAST 30% OF ALL DATA HAS AT LEAST HISTOGRAM LEVEL 4 | | | | AT LEAST 30% OF ALL DATA HAS AT LEAST HISTOGRAM LEVEL 4 | | | |

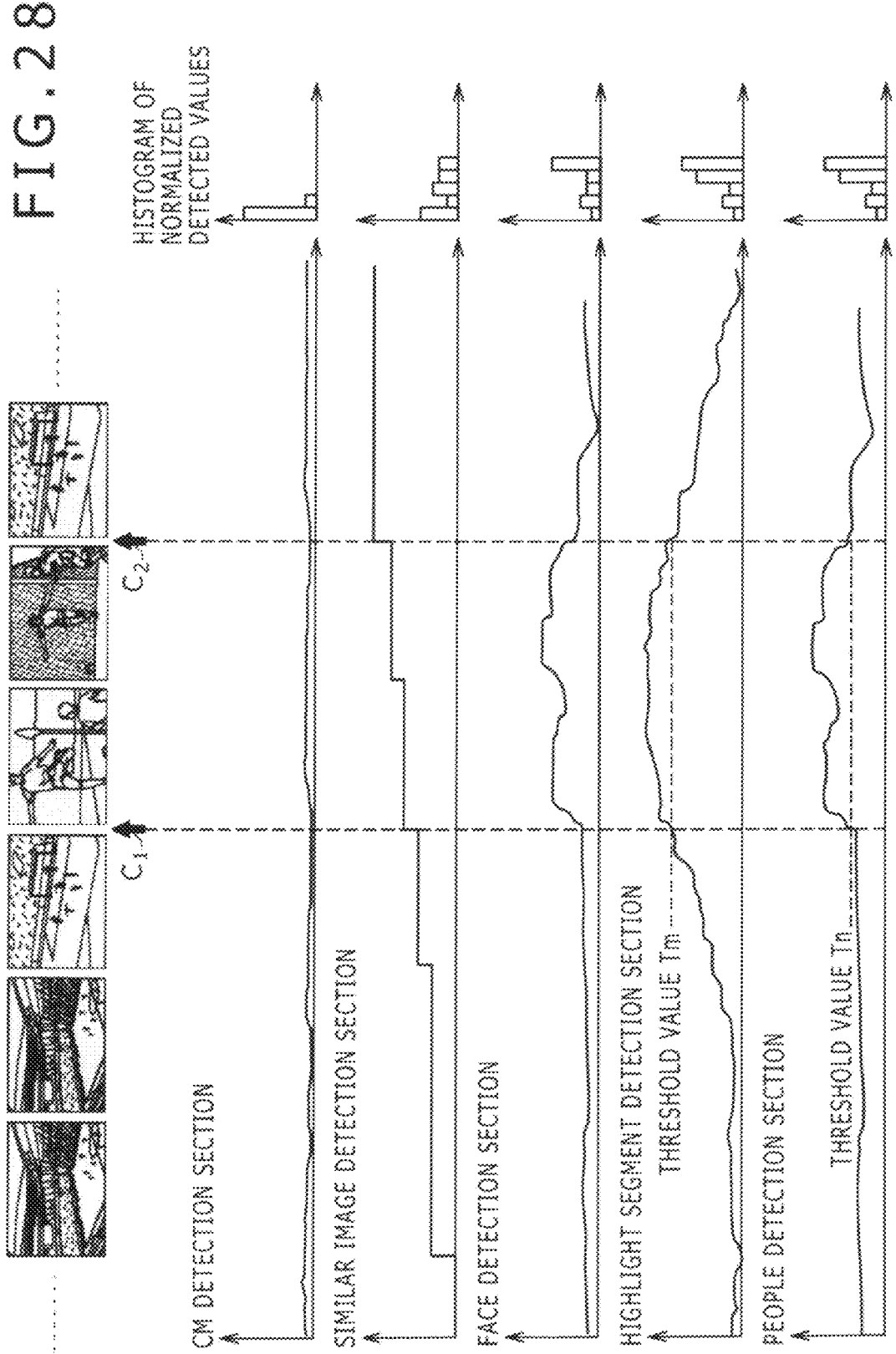

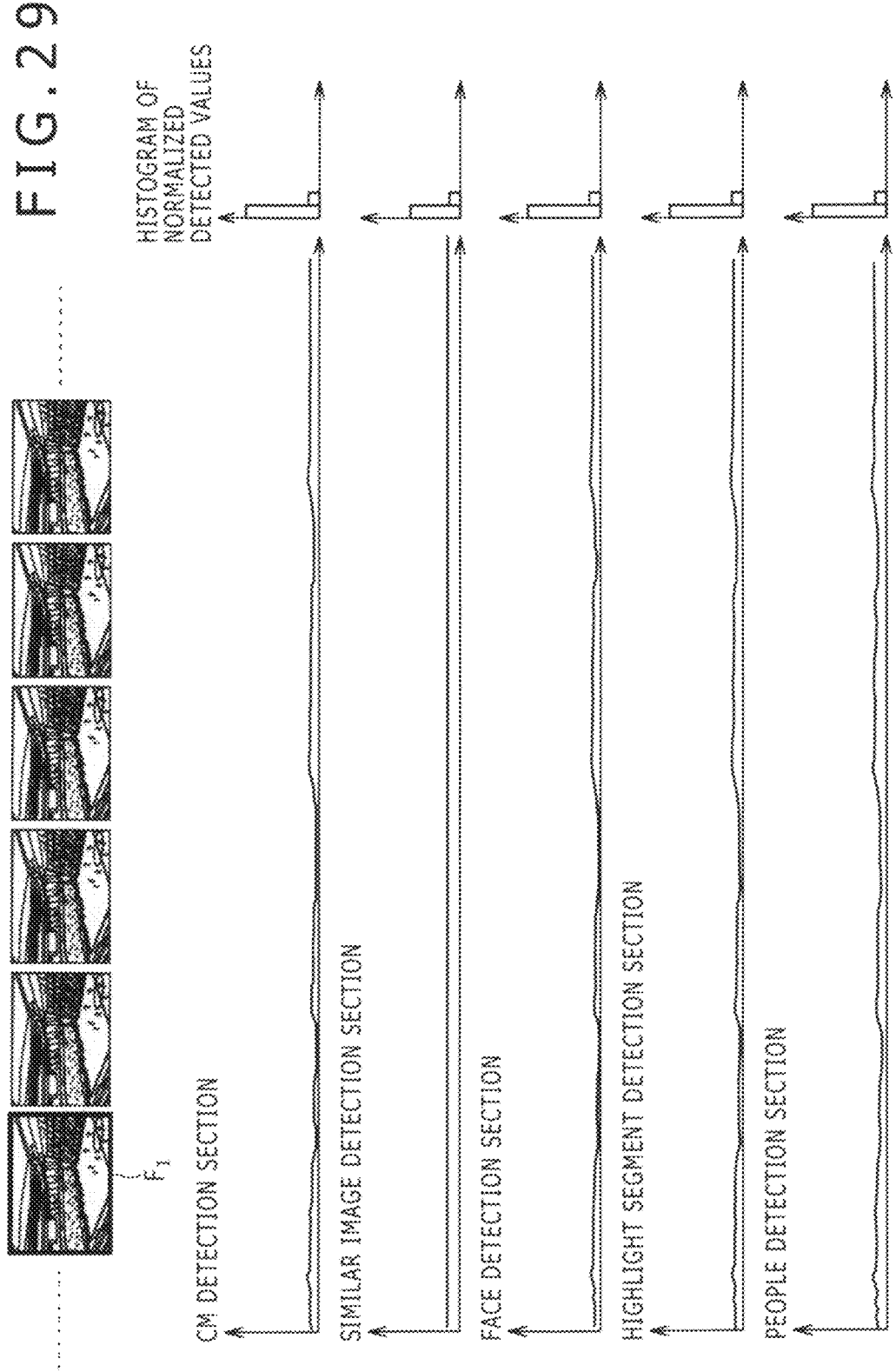

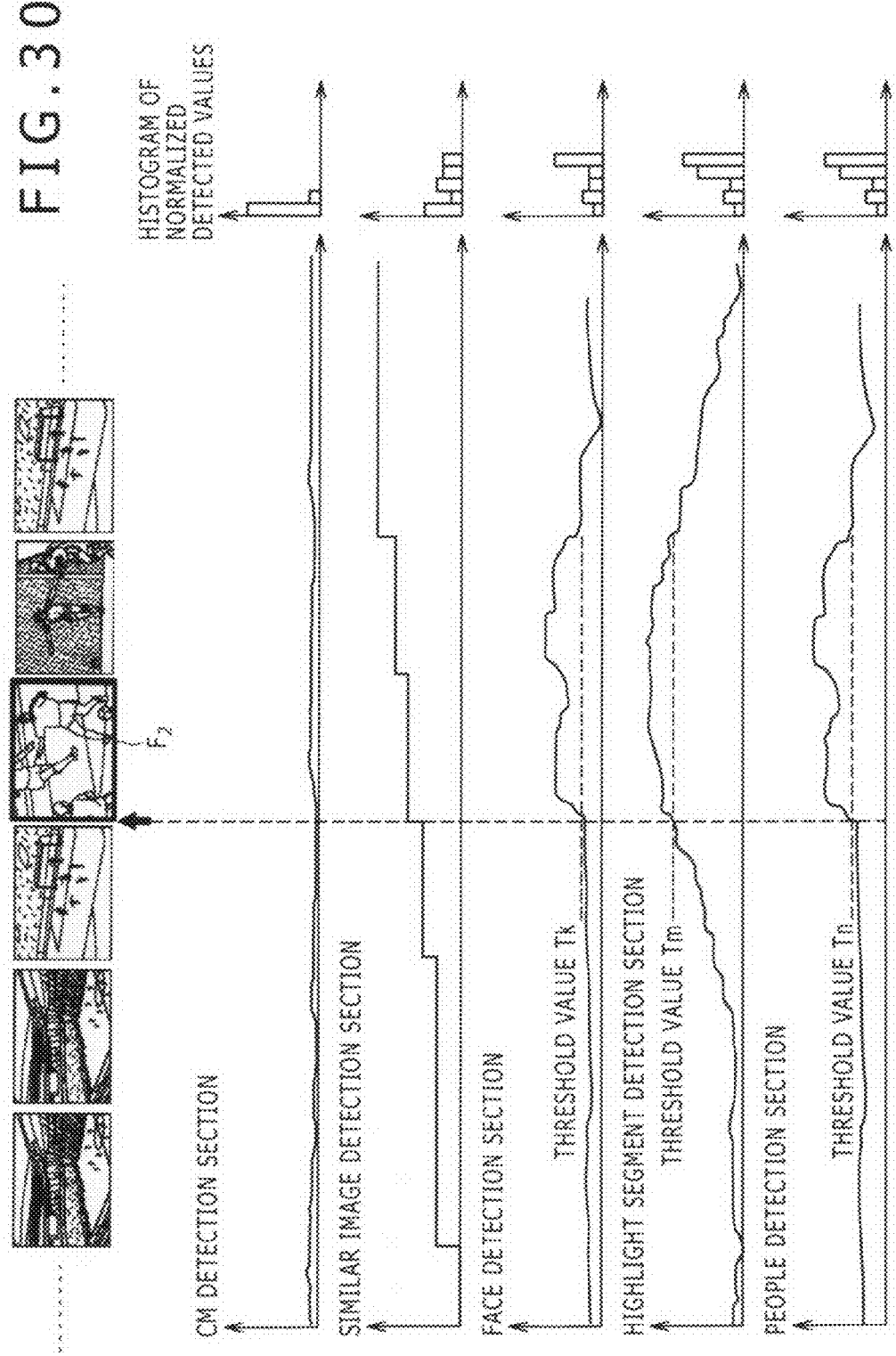

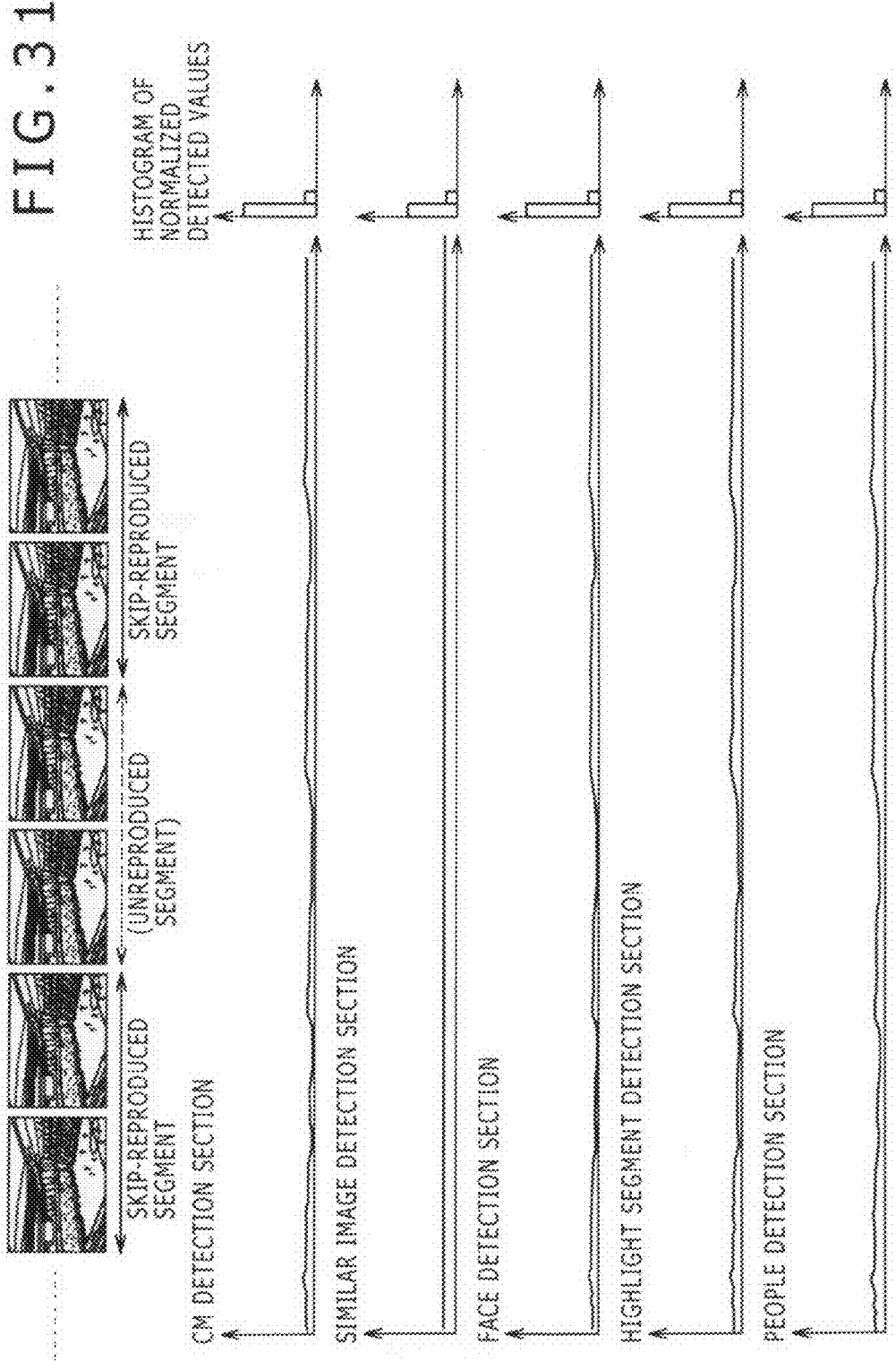

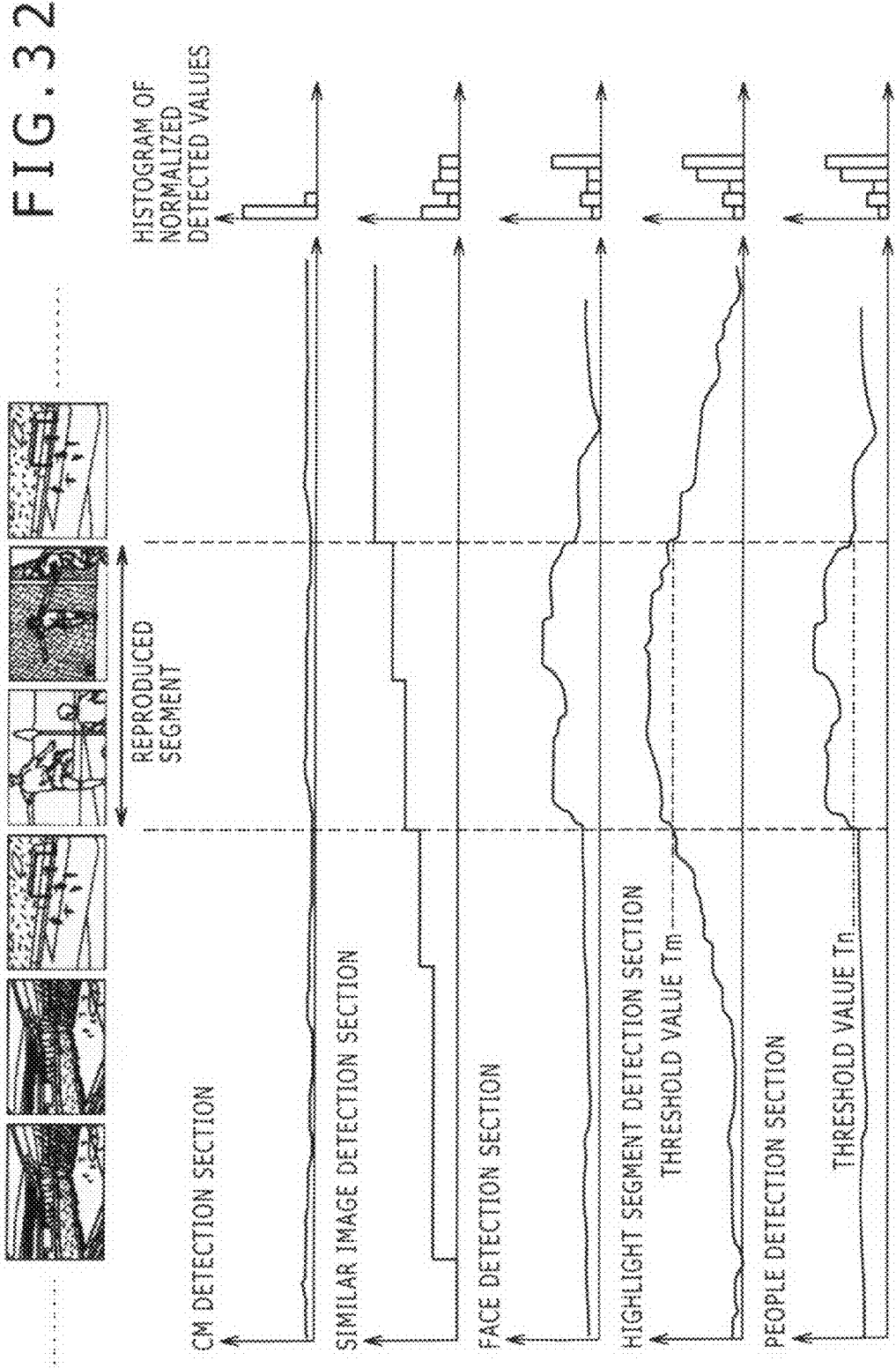

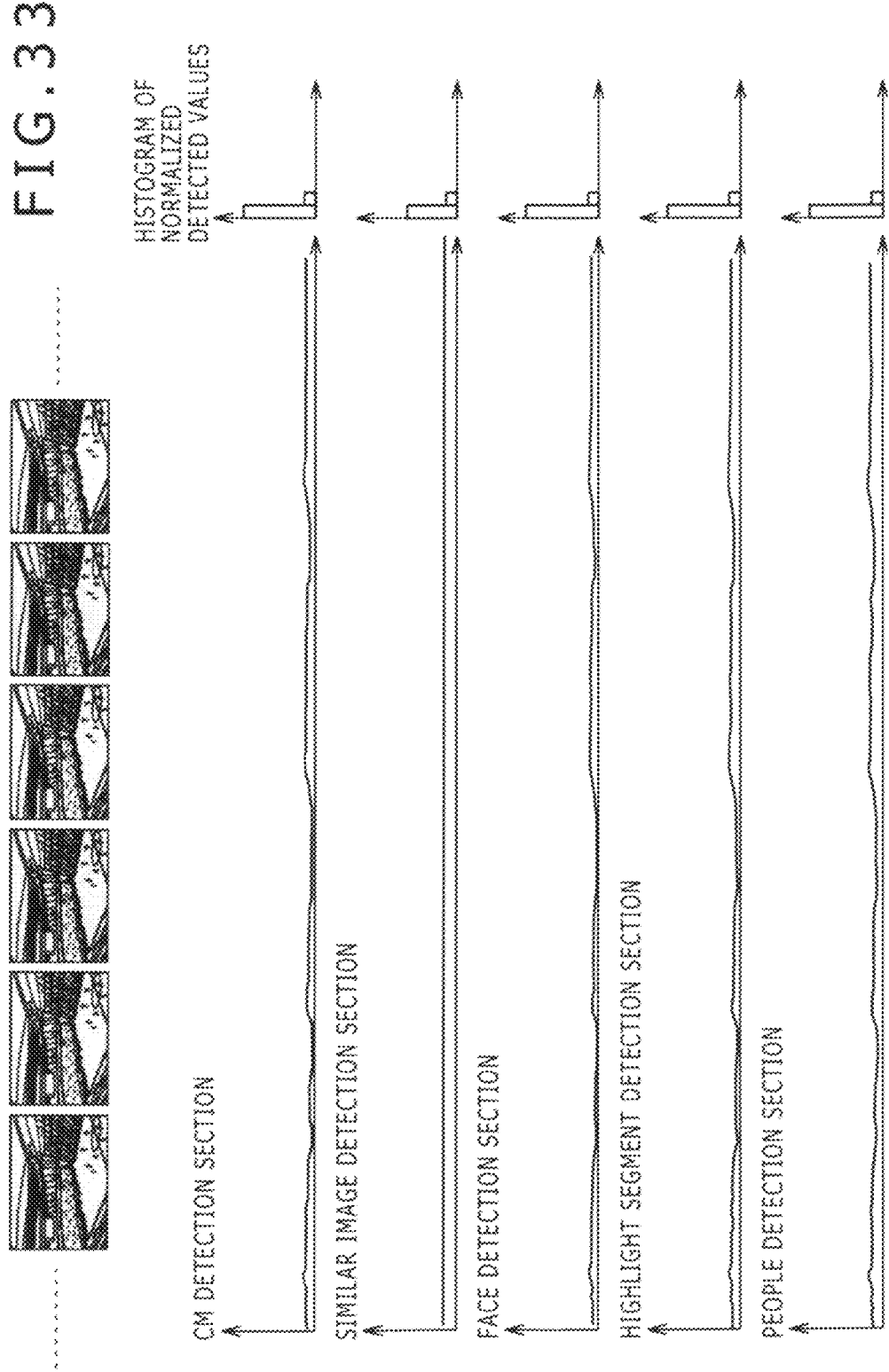

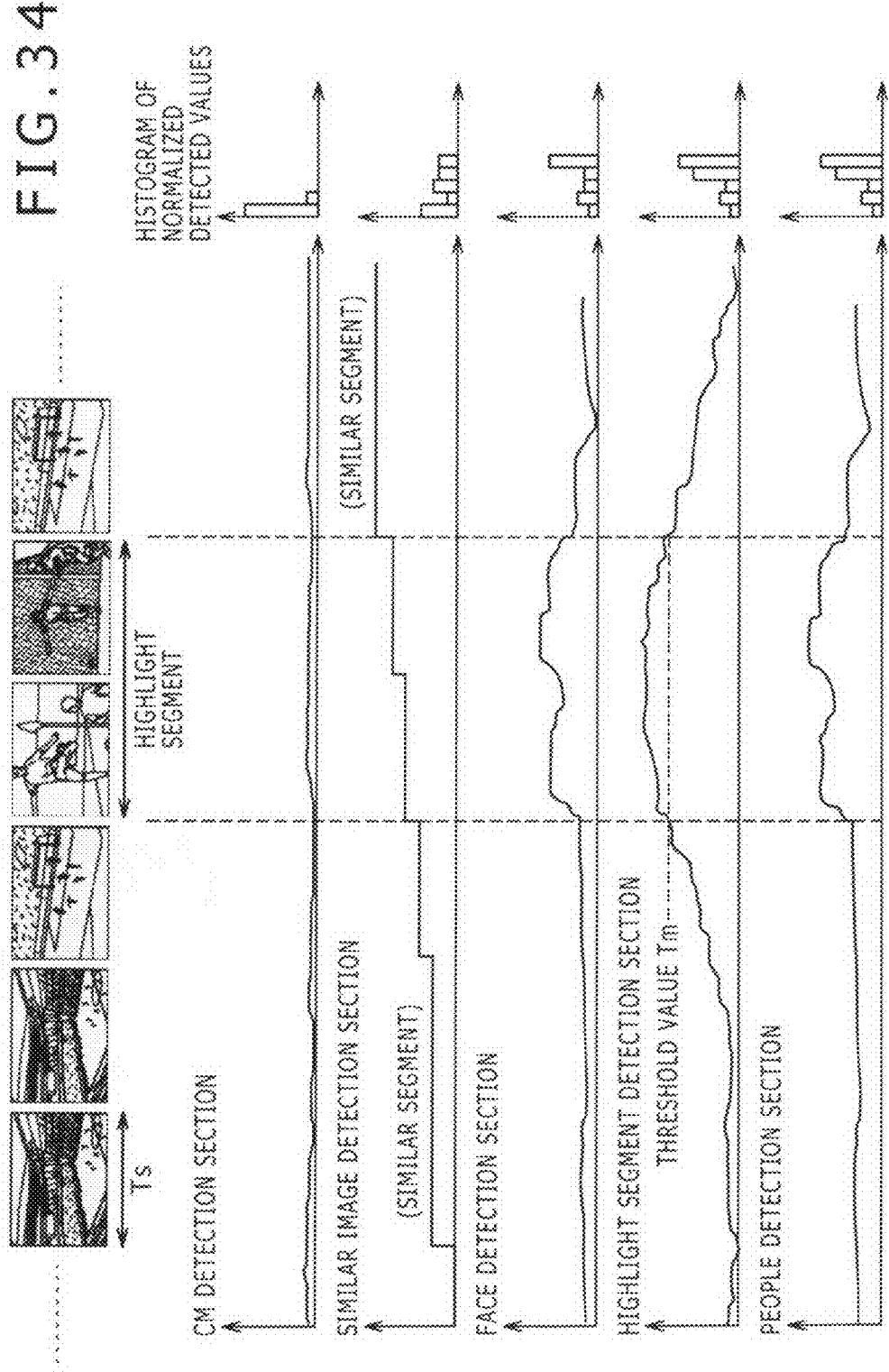

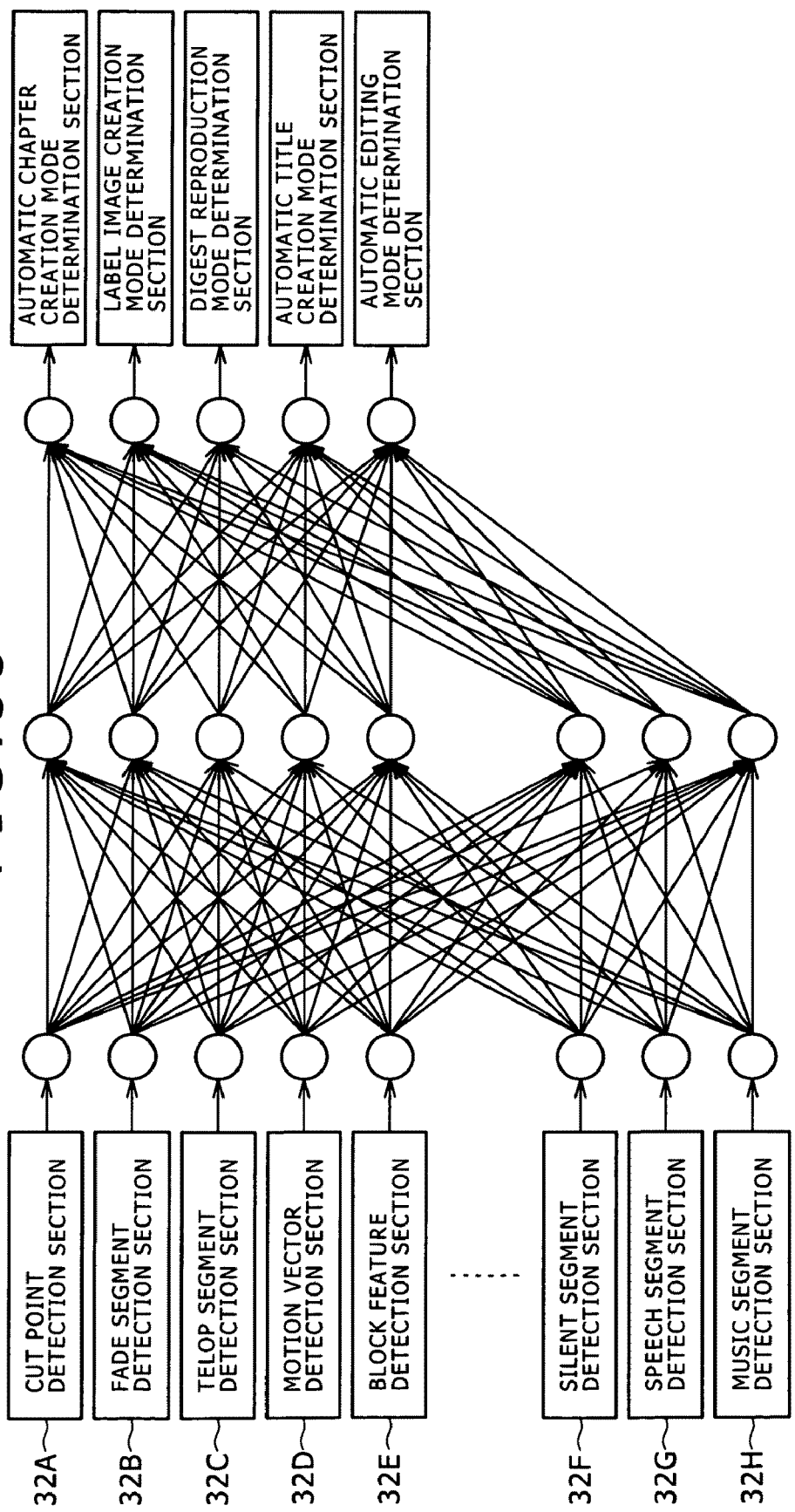

SIGNAL PROCESSING APPARATUS, SIGNAL PROCESSING METHOD, AND PROGRAM

CROSS REFERENCES TO RELATED APPLICATIONS

The present application claims priority from Japanese Patent Application No. JP 2007-245570, filed in the Japanese Patent Office on Sep. 21, 2007, the entire content of which is incorporated herein by reference.

BACKGROUND OF THE INVENTION

1. Field of the Invention

The present invention relates to a signal processing apparatus, a signal processing method, and a program. More particularly, the invention relates to a signal processing apparatus, a signal processing method, and a program for detecting layer features in flexible and efficient fashion.

2. Description of the Related Art

Recent years have witnessed widespread use of recording devices typified by hard disk recorders. The ever-increasing capacity and highly developed data compression techniques of the hard disk recorder are likely to entail an ever-increasing number of contents that can be recorded on the recording device.

Concomitant with these developments, a growing need is expected for efficiently managing and viewing large quantities of contents held on the recording device. A number of techniques for meeting the need have been proposed so far.

One such technique involves detecting features from a given content by analyzing its video and audio signals so that chapters of the content may be created automatically and only the scenes typical of the detected features may be reproduced continuously in so-called digest reproduction. The user can reproduce the content of interest starting from a desired scene by designating any one of the chapters automatically created by the recording device, or can check the entire content in a short time through digest reproduction.

In creating such chapters of a given content or in carrying out its digest reproduction, the recording device takes into consideration a plurality of features such as the positions of CM's (commercial messages) in the content, the presence or absence of scenes showing people's faces, and the presence or absence of scenes depicting highlights.

The features such as the positions of CM's in the content, the presence or absence of scenes showing people's faces, and the presence or absence of scenes depicting highlights are in turn determined in consideration of another set of multiple features. The latter features may include the positions of scene changes in the content, fade-in and fade-out positions, and the presence or absence of scenes showing people talking.

Furthermore, the features such as the positions of scene changes in the content, fade-in and fade-out positions, and the presence or absence of scenes showing people talking, which are considered to determine the features such as the positions of CM's in the content, the presence or absence of scenes showing people's faces, and the presence or absence of scenes depicting highlights, are determined in consideration of yet another set of multiple features. These features may include the brightness and color of the video signal, power levels of the audio signal, and frequencies in the content of interest.

That is, the ultimate objective of creating chapters and permitting digest reproduction is accomplished through the layered processes for detecting features. Low-level features such as the brightness and color of the video signal, power levels of the audio signal, and frequencies in the content of interest are first detected. High-level features such as the positions of CM's in the content, the presence or absence of scenes showing people's faces, and the presence or absence of scenes depicting highlights are then detected.

Japanese Patent Laid-open No. 2004-282318 discloses illustratively a technique for creating histograms showing the elements making up images and for detecting scene changes based on the histograms thus created.

SUMMARY OF THE INVENTION

In the ordinary layered detection of features outlined above, relations remain fixed between the process for detecting low-level features and the process for detecting high-level features. That means the features may not be detected in flexible and efficient fashion.

For example, suppose that the process for detecting a given high-level feature is designed to utilize a first and a second low-level feature. It might turn out later that the high-level feature in question could be detected more efficiently if a third low-level feature, other than the first and the second low-level feature, were utilized. With the traditional technique, however, this modification is not allowed to take place.

The present invention has been made in view of the above circumstances and provides arrangements for permitting layered detection of features flexibly and efficiently.

In carrying out the present invention and according to one embodiment thereof, there is provided a signal processing apparatus including first feature detection means for detecting a plurality of first feature data each representing a different feature from video and audio signals of a content; setting means for setting a weight for each of the plurality of first feature data detected by the first feature detection means, the weight corresponding to the feature for detecting data on the basis of the first feature data, the weight being varied either from one content to another or from one content genre to another; and second feature detection means for detecting a plurality of second feature data each representing a different feature on the basis of the plurality of first feature data for which the weights have been set by the setting means.

Preferably, the signal processing apparatus may further includes: presentation means for presenting a user with operations to allow choosing from regarding the content on the basis of the plurality of second feature data detected by the second feature detection means; and execution means for executing the operation selected by the user from among the operations presented by the presentation means.

Preferably, the presentation means may present the operations to allow choosing from using either screen display or audio output.

Preferably, the first feature detection means may include a plurality of processing sections configured individually to detect the first feature data on the basis of the audio signal and a plurality of processing sections configured individually to detect the first feature data on the basis of the video signal, the individual processing sections detecting the first feature data; and the second feature detection means may include a plurality of processing sections configured individually to detect the second feature data.

According to another embodiment of the present invention, there is provided a signal processing method as well as a program equivalent to the method, the signal processing method and the program each including the steps of: detecting a plurality of first feature data each representing a different feature from video and audio signals of a content; setting a weight for each of the detected plurality of first feature data, the weight corresponding to the feature for detecting data on the basis of the first feature data, the weight being varied either from one content to another or from one content genre to another; and detecting a plurality of second feature data each representing a different feature on the basis of the plurality of first feature data for which the weights have been set.

Where the signal processing apparatus, signal processing method, or program embodying the present invention is in use, a plurality of first feature data each representing a different feature are detected from video and audio signals of a content. A weight is then set for each of the detected plurality of first feature data, the weight corresponding to the feature for detecting data on the basis of the first feature data, the weight being varied either from one content to another or from one content genre to another. A plurality of second feature data each representing a different feature are detected on the basis of the plurality of first feature data for which the weights have been set.

The present invention, embodied illustratively as outlined above, permits layered detection of features in a flexible and efficient manner.

BRIEF DESCRIPTION OF THE DRAWINGS

FIG. 7 is a schematic view showing typical segments targeted for digest reproduction;

FIG. 23 is a tabular view listing what is typically represented by histogram data;

FIG. 24 is a tabular view listing typical histogram levels;

FIG. 25 is a schematic view showing how histogram data is typically normalized;

FIG. 26 is a tabular view listing operation mode criteria;

FIG. 28 is a schematic view showing other typical detected results of the features;

FIG. 29 is a schematic view showing other typical detected results of the features;

FIG. 30 is a schematic view showing other typical detected results of the features;

FIG. 31 is a schematic view showing other typical detected results of the features;

FIG. 32 is a schematic view showing other typical detected results of the features;

FIG. 33 is a schematic view showing other typical detected results of the features;

FIG. 34 is a schematic view showing other typical detected results of the features; and FIG. 35 is a block diagram showing another typical functional structure of the signal processing apparatus.

DETAILED DESCRIPTION OF THE PREFERRED EMBODIMENTS

Figure 1:
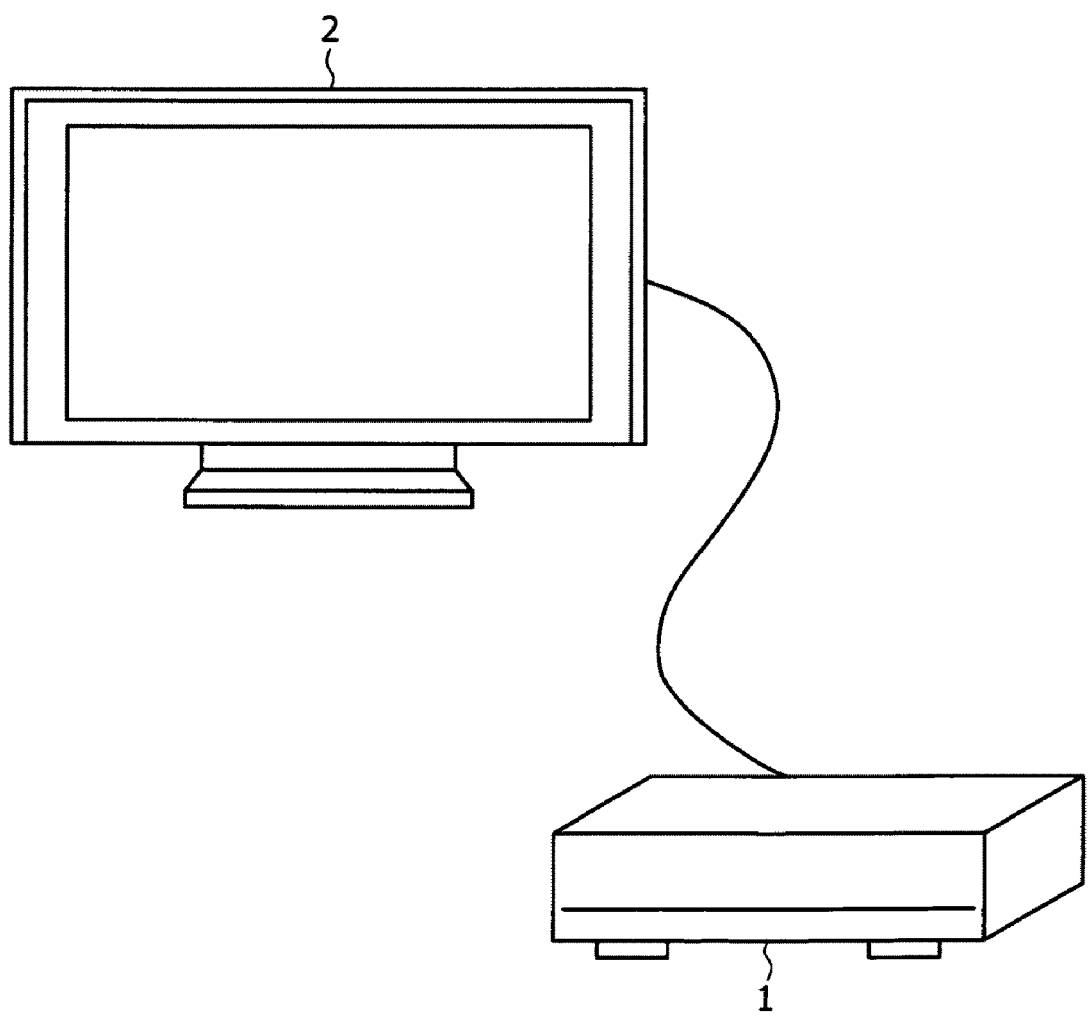
FIG. 1 is a schematic view showing a signal processing apparatus practiced as one embodiment of the present invention.

What is described below as the preferred embodiments of the present invention with reference to the accompanying drawings corresponds to the appended claims as follows: the description of the preferred embodiments basically provides specific examples supporting what is claimed. If any example of the invention described below as a preferred embodiment does not have an exactly corresponding claim, this does not mean that the example in question has no relevance to the claims. Conversely, if any example of the invention depicted hereunder has a specifically corresponding claim, this does not mean that the example in question is limited to that claim or has no relevance to other claims.

One embodiment of the present invention is a signal processing apparatus (e.g., signal processing apparatus 1 in FIG. 1) including: first feature detection means (e.g., intermediate-level feature detection section 32 in FIG. 4) for detecting a plurality of first feature data each representing a different feature from video and audio signals of a content; setting means (e.g., weighting factor setting section 35 in FIG. 4) for setting a weight for each of the plurality of first feature data detected by the first feature detection means, the weight corresponding to the feature for detecting data on the basis of the first feature data, the weight being varied either from one content to another or from one content genre to another; and second feature detection means (e.g., high-level feature detection section 33 in FIG. 4) for detecting a plurality of second feature data each representing a different feature on the basis of the plurality of first feature data for which the weights have been set by the setting means.

Preferably, the signal processing apparatus may further includes: presentation means (e.g., operation mode determination section 37 in FIG. 4) for presenting a user with operations to allow choosing from regarding the content on the basis of the plurality of second feature data detected by the second feature detection means; and execution means (e.g., operation mode execution section 34 in FIG. 4) for executing the operation selected by the user from among the operations presented by the presentation means.

Another embodiment of the present invention is a signal processing method as well as a program equivalent to the method, the signal processing method and the program each including the steps of: detecting a plurality of first feature data each representing a different feature from video and audio signals of a content; setting a weight for each of the detected plurality of first feature data, the weight corresponding to the feature for detecting data on the basis of the first feature data, the weight being varied either from one content to another or from one content genre to another; and detecting (e.g., in step S53 of FIG. 16) a plurality of second feature data each representing a different feature on the basis of the plurality of first feature data for which the weights have been set.

The preferred embodiments of the present invention will now be described in reference to the accompanying drawings.

FIG. 1 is a schematic view showing a signal processing apparatus 1 practiced as one embodiment of the present invention.

The signal processing apparatus 1 is a digital recording device that incorporates a hard disk drive. A television (TV) set 2 is connected to the signal processing apparatus 1 using a cable.

Using signals fed from an antenna (not shown), the signal processing apparatus 1 receives contents (i.e., TV programs) broadcast over BS (broadcasting satellite) or CS (communications satellite) digital broadcasting networks, terrestrial digital broadcasting networks or the Internet, and causes the received contents to be output to the TV set 2 in images and sounds or recorded to the internal hard disk drive for storage. The signal processing apparatus 1 reproduces the recorded content as instructed by the user and enables the TV set 2 to output the reproduced content in images and sounds.

The signal processing apparatus 1 acquires and manages EPG (electronic program guide) data that is distributed by broadcasting stations using broadcast waves or over the Internet. The EPG data includes content-related information such as the titles of contents, the dates and times at which the contents are to be broadcast, the genres of the contents, and the names of the people appearing in the contents.

The signal processing apparatus 1 typically has the capability of presenting the user with operations to choose from regarding a given content selected by the user from a list of recorded content titles. The operations to be presented to the user are selected on the basis of the features detected from the video and audio signals of the content in question.

The signal processing apparatus 1 offers a number of operation modes (i.e., operations) including an automatic chapter creation mode, a label image creation mode, a digest reproduction mode, an automatic title creation mode, and an automatic editing mode. These operation modes are selectively presented to the user.

The automatic chapter creation mode is a mode in which chapters of a recorded content are automatically created. The label image creation mode is a mode in which to create automatically an image of the label surface on the optical disk on which the content of interest is recorded.

The digest reproduction mode is a mode in which a recoded content is subjected to digest reproduction. The automatic title creation mode is a mode in which to create automatically a title based on a given recorded content. The automatic editing mode is a mode the recorded content of interest is subjected to cut editing.

The user may select any one of the operation modes that are presented as selectable. The operation mode when selected is executed to implement the corresponding process outlined above.

Figure 2:
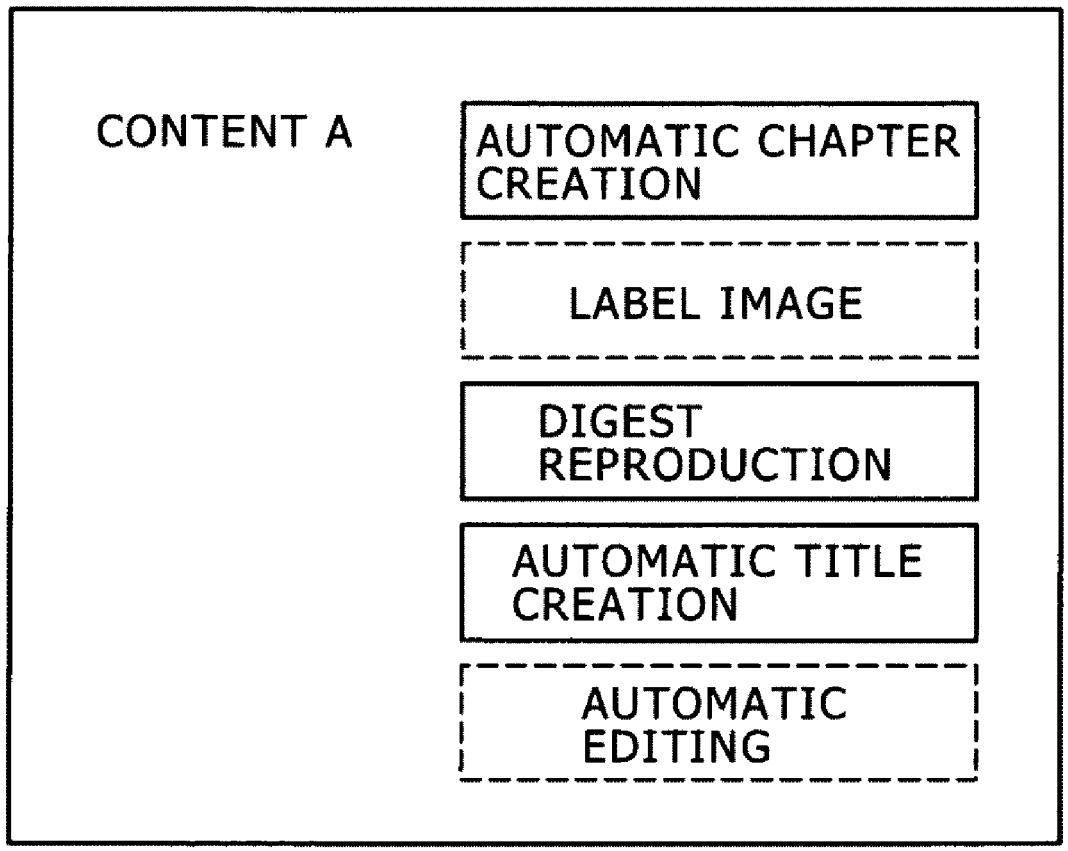
FIG. 2 is a schematic view showing a typical display screen.

FIG. 2 is a schematic view showing a typical display screen on which operation modes are presented.

In the example of FIG. 2, a content A is selected. Of the automatic chapter creation mode, label image creation mode, digest reproduction mode, automatic title creation mode, and automatic editing mode being offered, three operation modes are presented to the user as selectable. The selectable modes are the automatic chapter creation mode, digest reproduction mode, and automatic title creation mode.

The user may select and execute any one of the selectable operation modes by pressing on the screen the corresponding button representative of the operation mode in question. In FIG. 2, the solid lines enclosing the name of a given operation mode and constituting its button indicate that the operation mode represented by that button is selectable. The broken lines enclosing the name of a given operation mode and constituting its button show that the operation mode denoted by that button is not selectable.

Suppose that the automatic chapter creation mode is selected with its button selectively operated on the screen of FIG. 2. In that case, based on the result of the analysis of the content A, the signal processing apparatus 1 carries out the process of automatically setting chapters for specific positions such as the starting and ending positions of CM's and scene changing positions in the content A. By selecting any one of the chapters thus established by the signal processing apparatus 1, the user may reproduce the content A starting from the preferred scene represented by the selected chapter.

How the signal processing apparatus 1 detects features from the content preparatory to presenting operation modes will be discussed later in reference to the accompanying flowcharts.

Figure 3:
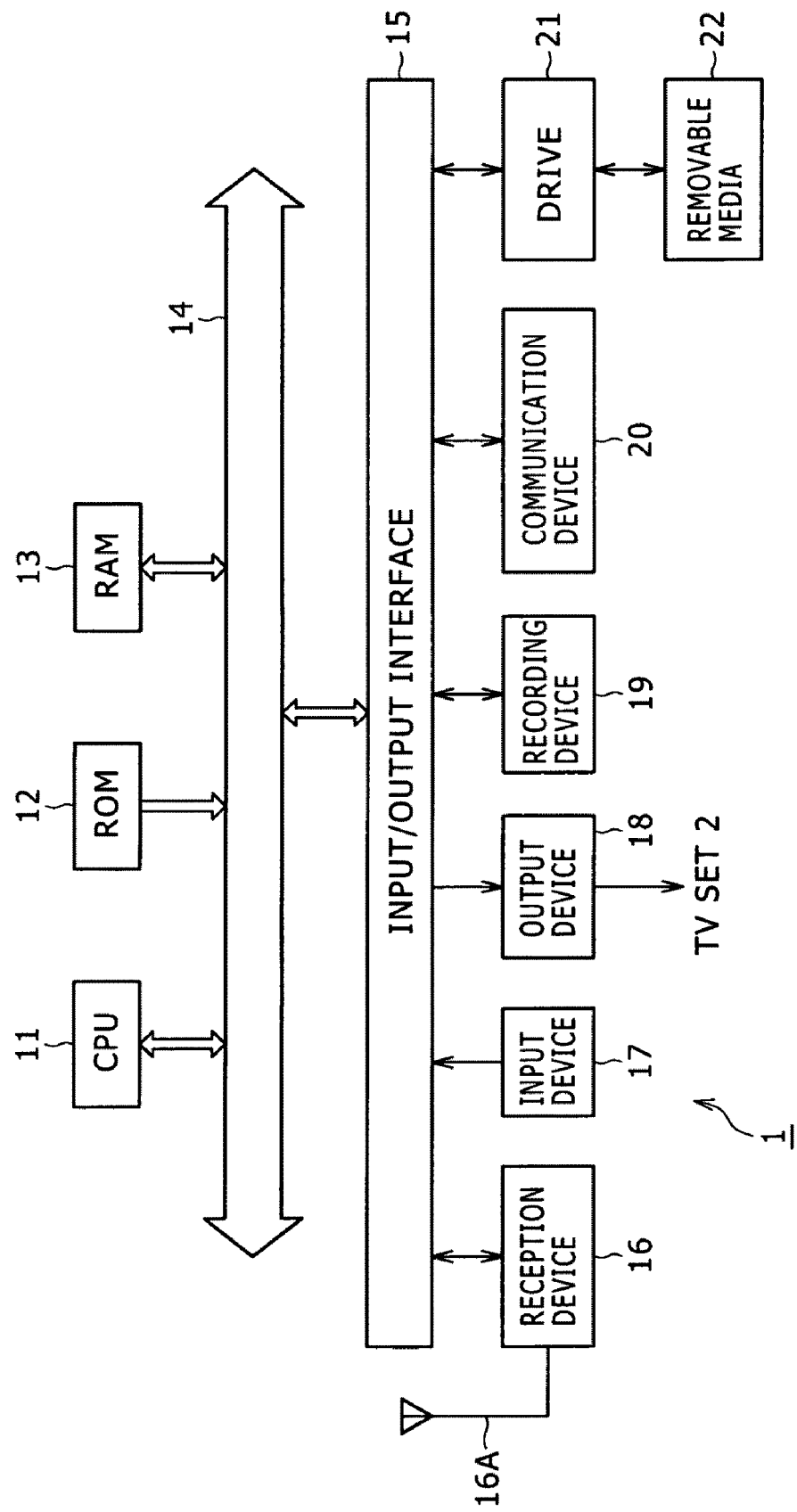
FIG. 3 is a block diagram showing a typical hardware structure of the signal processing apparatus.

FIG. 3 is a block diagram showing a typical hardware structure of the signal processing apparatus 1.

A CPU (central processing unit) 11 performs diverse processes in accordance with the programs that are stored in a ROM (read only memory) 12 or a recording device 19. As needed, a RAM (random access memory) 13 accommodates the programs or the data being executed or operated on by the CPU 11. The CPU 11, ROM 12, and RAM 13 are interconnected via a bus 14.

An input/output interface 15 is connected to the CPU 11 through the bus 14. The input/output interface is connected with a reception device 16, an input device 17, an output device 18, the recording device 19, a communication device 20, and a drive 21.

The reception device 16 receives and demodulates broadcast wave signals from an antenna 16A in order to acquire MPEG-TS (Moving Picture Experts Group-Transport Stream). The reception device 16 acquires from the MPEG-TS the contents to be recorded and their EPG data, and outputs the acquired data to the recording device 19 through the input/output interface 15.

From a remote controller, the input device 17 receives signals representative of the user's operations. The input device 17 proceeds to output information denoting the user's operations to the CPU 11 through the input/output interface 15 and bus 14.

The output device 18 decodes the data of the content designated to be reproduced. Based on the video signal derived from the decoding, the output device 18 causes the TV set 2 to display images of the content in question.

The recording device 19 is typically composed of a hard disk drive. The recording device 19 records the programs to be executed by the CPU 11 and a variety of data such as contents and EPG data sent from the reception device 16 through the input/output interface 15. If a content acquired by a home-use camcorder is imported into the signal processing apparatus 1, then the recording device 19 records the imported content.

Through communication with servers, the communication device 20 acquires content data broadcast over the Internet as well as EPG data distributed by relevant servers. The communication device 20 proceeds to output the acquired data through the input/output interface 15 to the recording device 19 for storage.

The drive 21 copies contents from the attached piece of removable media 22 such as an optical disk and acquires programs or data from the attached medium. The programs and data thus acquired are transferred as needed to the recording device 19 for storage.

Figure 4:
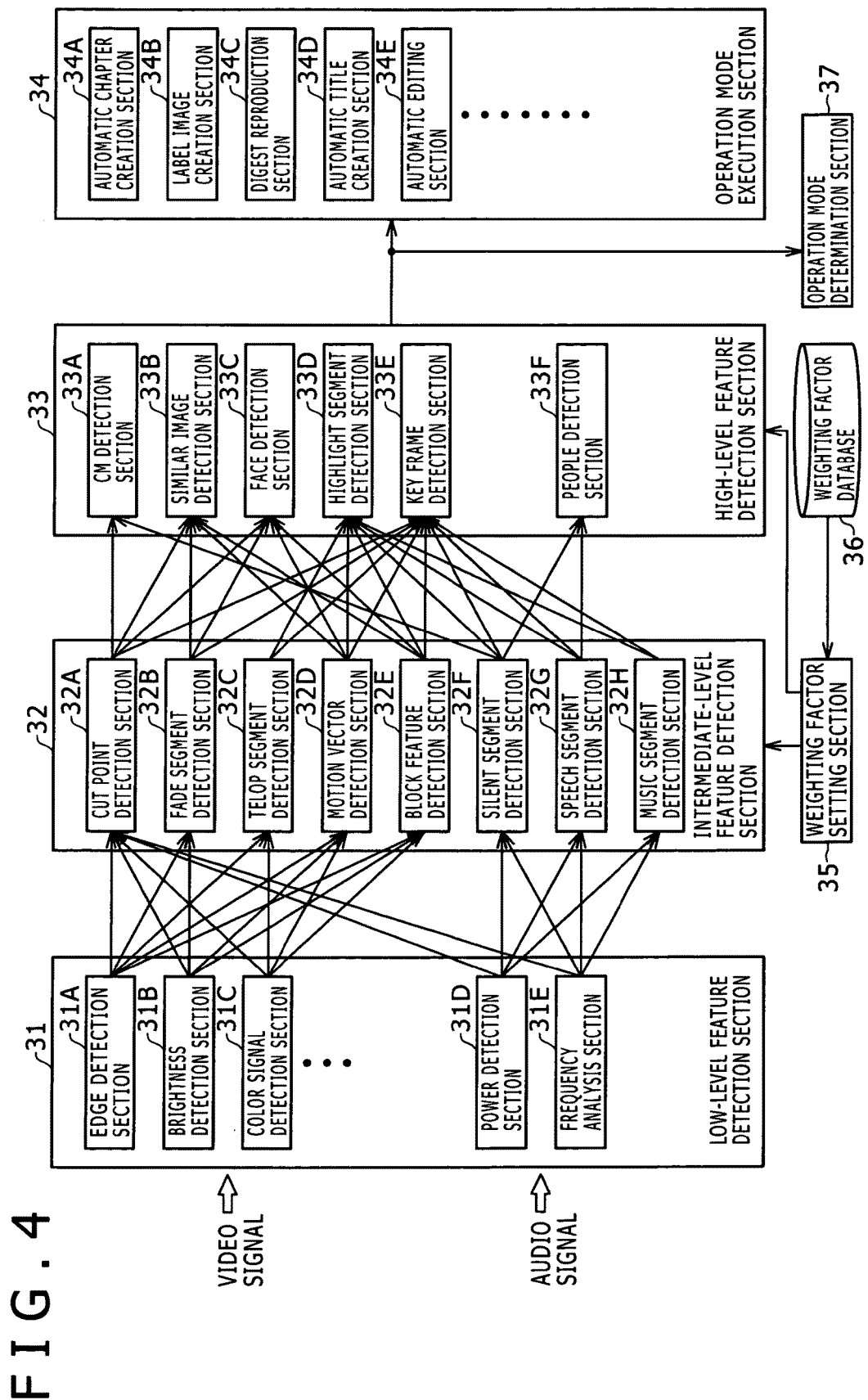
FIG. 4 is a block diagram showing a typical functional structure of the signal processing apparatus.

FIG. 4 is a block diagram showing a typical functional structure of the signal processing apparatus 1. At least part of the functional sections indicated in FIG. 4 are implemented by the CPU 11 (FIG. 3) executing appropriate programs.

As shown in FIG. 4, the signal processing apparatus 1 has a low-level feature detection section 31, an intermediate-level feature detection section 32, a high-level feature detection section 33, an operation mode execution section 34, a weighting factor setting section 35, a weighting factor database 36, and an operation mode determination section 37 implemented therein.

The low-level feature detection section 31 is constituted by an edge detection section 31A, a brightness detection section 31B, and a color signal detection section 31C which are designed to process the video signal of a given content; and by a power detection section 31D and a frequency analysis section 31E which are set to process the audio signal of the content. The low-level feature detection section 31 is supplied with the video and audio signals of the content that is targeted for feature detection typically as a result of the user's selecting operation on a title list screen. Alternatively, contents may be processed for feature detection before any of them is selected from the title list screen.

The intermediate-level feature detection section 32 is made up of a cut point detection section 32A, a fade segment detection section 32B, a telop segment detection section 32C, a motion vector detection section 32D, a block feature detection section 32E, a silent segment detection section 32F, a speech segment detection section 32G, and a music segment detection section 32H.

The high-level feature detection section 33 is formed by a CM detection section 33A, a similar image detection section 33B, a face detection section 33C, a highlight segment detection section 33D, a key frame detection section 33E, and a people detection section 33F.

The operation mode execution section 34 is composed of an automatic chapter creation section 34A, a label image creation section 34B, a digest reproduction section 34C, an automatic title creation section 34D, and an automatic editing section 34E.

The low-level feature detection section 31 detects features directly from analyzing the video and audio signals of contents. The intermediate-level feature detection section 32 detects features on the basis of the detected results obtained by the low-level feature detection section 31. In turn, the high-level feature detection section 33 detects features based on the detected results acquired by the intermediate-level feature detection section 32.

That is, the intermediate-level feature detection section 32 detects features on the basis of the features detected earlier by the low-level feature detection section 31. In that sense, the features detected by the intermediate-level feature detection section 32 are regarded as more sophisticated than those detected by the low-level feature detection section 31. Similarly, the high-level feature detection section 33 detects features based on the features detected earlier by the intermediate-level feature detection section 32. That means the features detected by the high-level feature detection section 33 are considered more sophisticated than those detected by the intermediate-level feature detection section 32.

As described, the signal processing apparatus 1 is characterized by its layered feature detection scheme: low-level features are first detected by the low-level feature detection section 31; intermediate-level features are then detected by the intermediate feature detection section 32; and high-level features are detected by the high-level feature detection section 33.

The edge detection section 31A in the low-level feature detection section 31 detects edges of the video signal of a given content. Information representing the edge positions in frames is output by the edge detection section 31A to the intermediate-level component sections ranging from the cut point detection section 32A to the block feature detection section 32E in the intermediate-level feature detection section 32.

An edge is the position where a signal changes. It is thus common practice to detect the edges using differential equations by which to calculate such signal changes. Illustratively, the edge detection section 31A calculates a differential quantity $f_x$ in the horizontal (X) direction and a differential quantity $f_y$ in the vertical (Y) direction of an image using the following equations (1):

$$f_x = s(i+1, j) - s(i, j)$$

$$f_y = s(i, j+1) - s(i, j) \qquad (1)$$

where, s(i, j) denotes values of a pixel, "i" standing for the coordinate position of the pixel in the X direction and "j" denoting its coordinate position in the Y direction.

Based on the differential quantities thus calculated, the edge detection section 31A computes an edge intensity e(i, j) at a coordinate position (i, j) using the following equation (2):

$$e(i,j) = fx \times fx + fy \times fy \qquad (2)$$

If the edge intensity calculated by the equation (2) above is found to exceed a predetermined threshold value, then the edge detection section 31A detects the corresponding pixel position as an edge position and outputs the detected result. Some other methods may be used alternatively for edge detection.

The brightness detection section 31B detects the brightness level of each pixel from the video signal of a given content. Brightness information thus detected is output by the brightness detection section 31B to the cut point detection section 32A, fade segment detection section 32B, motion vector detection section 32D, and block feature detection section 32E of the intermediate-level feature detection section 32.

The color signal detection section 31C detects the color signals of each pixel from the video signal of the content. Color signal information thus detected is output by the color signal detection section 31C to the cut point detection section 32A, motion vector detection section 32D, and block feature detection section 32E of the intermediate-level feature detection section 32.

The power detection section 31D detects audio power levels from the audio signal of the content. Audio power information thus detected is output by the power detection section 31D to the cut point detection section 32A, silent segment detection section 32F, speech segment detection section 32G, and music segment detection section 32H of the intermediate-level feature detection section 32.

The frequency analysis section 31E analyzes the audio signal of the content for frequencies. Audio information found from different frequency bands is output by the frequency analysis section 31E to the cut point detection section 32A, silent segment detection section 32F, speech segment detection section 32G, and music segment detection section 32H of the intermediate-level feature detection section 32.

The cut point detection section 32A in the intermediate-level feature detection section 32 detects cut points (i.e., scene change points) based on the detected results coming from the component sections of the low-level feature detection section 31. Information denoting the cut points is output by the cut point detection section 32A to the CM detection section 33A, similar image detection section 33B, face detection section 33C, and key frame detection section 33E of the high-level feature detection section 33.

When detecting cut points, the cut point detection section 32A assigns weights to the detected results from the component sections of the low-level feature detection section 31 by use of the weighting factors set by the weighting factor setting section 35. Where the detected results from the component sections of the low-level feature detection section 31 are numerically expressed, the cut point detection section 32A multiples these results by relevant weighting factors. The cut point detection section 32A then detects cut points based on the results multiplied by the weighting factors.

Of the detected results coming from the component sections of the low-level feature detection section 31, those that are deemed particularly important for cut point detection are matched with weighting factors such as to contribute significantly to the eventual result of the detection. On the other hand, the detected results which come from the low-level feature detection section 31 and which are not particularly important for cut point detection are matched with weighting factors such as to contribute little to the eventual result of cut point detection.

More specifically, the cut point detection section 32A divides the image of each frame into a predetermined number of areas and, based on the averaged values of brightness information and color signal information (color difference information) about each of the areas, calculates inter-frame or inter-field differences. The cut point detection section 32A compares the differences thus calculated with a threshold value. Illustratively, the difference between frames or between fields is lower than the threshold value if there is no cut point; the difference is higher than the threshold value if there is a cut point.

In the case above, large weighting factors are assigned to the detected results from the brightness detection section 31B and color signal detection section 31C, among the detected results supplied by the component sections of the low-level feature detection section 31.

Based on the weighting factors set by the weighting factor setting section 35, the fade segment detection section 32B assigns weights to the detected results coming from the component sections of the low-level feature detection section 31 in order to detect fade segments. Information denoting the positions of the detected fade segments is output by the fade segment detection section 32B to the similar image detection section 33B, face detection section 33C, and key frame detection section 33E of the high-level feature detection section 33.

Based on the weighting factors set by the weighting factor setting section 35, the telop segment detection section 32C assigns weights to the detected results coming from the component sections of the low-level feature detection section 31 in order to detect telop segments in which telop is displayed. Information representing the position of the detected telop segments is output by the telop segment detection section 32C to the highlight segment detection section 33D and key frame detection section 33E of the high-level feature detection section 33. Illustratively, if a predetermined region of frames is found to contain numerous edges and if such conditions are found to continue for a predetermined length, then that segment is detected as a telop segment.

Based on the weighting factors set by the weighting factor setting section 35, the motion vector detection section 32D assigns weights to the detected results coming from the component sections of the low-level feature detection section 31 in order to detect a motion vector that represents the moving direction of a given pixel and the quantity of the motion involved. Information denoting the detected motion vector is output by the motion vector detection section 32D to the similar image detection section 33B, face detection section 33C, highlight segment detection section 33D, and key frame detection section 33E of the high-level feature detection section 33.

Based on the weighting factors set by the weighting factor setting section 35, the block feature detection section 32E assigns weights to the detected results coming from the component sections of the low-level feature detection section 31. The block feature detection section 32E proceeds to detect block features such as the brightness average and color signal average regarding each of the divided areas in each image frame. Information representing the detected block features is output by the block feature detection section 32E to the similar image detection section 33B, face detection section 33C, highlight segment detection section 33D, and key frame detection section 33E of the high-level feature detection section 33.

Based on the weighting factors set by the weighting factor setting section 35, the silent segment detection section 32F assigns weights to the detected results coming from the component sections of the low-level feature detection section 31 in order to detect silent segments. Information denoting the detected silent segments is output by the silent segment detection section 32F to the CM detection section 33A, highlight segment detection section 33D, key frame detection section 33E, and people detection section 33F of the high-level feature detection section 33.

Based on the weighting factors set by the weighting factor setting section 35, the speech segment detection section 32G assigns weights to the detected results coming from the component sections of the low-level feature detection section 31 in order to detect speech segments in which people are talking. Information representing the detected speech segments is output by the speech segment detection section 32G to the highlight segment detection section 33D, key frame detection section 33E, and people detection section 33F of the high-level feature detection section 33.

Based on the weighting factors set by the weighting factor setting section 35, the music segment detection section 32H assigns weights to the detected results coming from the component sections of the low-level feature detection section 31 in order to detect music segments in which music is being played. Information denoting the detected music segments is output by the music segment detection section 32H to the highlight segment detection section 33D and key frame detection section 33E of the high-level feature detection section 33.

Based on the weighting factors set by the weighting factor setting section 35, the CM detection section 33A in the high-level feature detection section 33 assigns weights to the detected results coming from the component sections of the intermediate-level feature detection section 32 in order to detect CM segments.

Illustratively, TV commercials are broadcast over Japanese TV networks in such a manner that a silent segment is detected at intervals of an integral multiple of 15 seconds. Accordingly, if the detected result supplied from the silent segment detection section 32F represents that the silent segments are detected at every intervals of an integral multiple of 15 seconds, the CM detection section 33A thus detects a CM segment between two silent segments. In that case, the CM detection section 33A multiplies by large weighting factors the detected results coming from the component sections of the intermediate-level feature detection section 32 in order to detect CM segments.

Information representing the detected CM segments is output by the CM detection section 33A to the operation mode execution section 34 and operation mode determination section 37.

Based on the weighting factors set by the weighting factor setting section 35, the similar image detection section 33B assigns weights to the detected results coming from the component sections of the intermediate-level feature detection section 32 in order to detect segments in which similar images continue. Illustratively, the similar image detection section 33B detects from scenes those images that are similar to one another based on the motion vector detected by the motion vector detection section 32D and on the block features detected by the block feature detection section 32E.

Information denoting the detected similar image segments is output by the similar image detection section 33B to the operation mode execution section 34 and operation mode determination section 37.

Based on the weighting factors set by the weighting factor setting section 35, the face detection section 33C assigns weights to the detected results coming from the component sections of the intermediate-level feature detection section 32 in order to detect people's faces. Illustratively, upon detecting facial contours or face parts from the block features detected by the block feature detection section 32E, the face detection section 33C detects the contours as people's faces.

Information such as the number of detected people's faces and their positions in each frame is output by the face detection section 33C to the operation mode execution section 34 and operation mode determination section 37.

Based on the weighting factors set by the weighting factor setting section 35, the highlight segment detection section 33D assigns weights to the detected results coming from the component sections of the intermediate-level feature detection section 32 in order to detect highlight segments in which a highlight of the content in question is taking place.

Illustratively, given the segments in which telop and speech were frequently detected by the telop segment detection section 32C and speech segment detection section 32G respectively, the highlight segment detection section 33D detects these segments as highlight segments.

Information denoting the detected highlight segments is output by the highlight segment detection section 33D to the operation mode execution section 34 and operation mode determination section 37.

Based on the weighting factors set by the weighting factor setting section 35, the key frame detection section 33E assigns weights to the detected results coming from the component sections of the intermediate-level feature detection section 32 in order to detect key frames that are deemed to represent the content in question. Information about the detected key frames is output by the key frame detection section 33E to the operation mode execution section 34 and operation mode determination section 37.

Based on the weighting factors set by the weighting factor setting section 35, the people detection section 33F assigns weights to the detected results coming from the component sections of the intermediate-level feature detection section 32 in order to detect the presence or absence of people. Information representing the presence or absence of detected people is output by the people detection section 33F to the operation mode execution section 34 and operation mode determination section 37.

As described, the component sections of the low-level feature detection section 31 and those of the intermediate-level feature detection section 32 are connected to form a network. Likewise the component sections of the intermediate-level feature detection section 32 and those of the high-level feature detection section 33 are connected to form another network. In this networked structure, a downstream section may carry out its feature detection based on the detected results from the upstream section in a manner reflecting the weighting factors involved.

The connections between the component sections shown in FIG. 4 may be changed as needed. Illustratively, all component sections of the intermediate-level feature detection section 32 may be connected to the CM detection section 33A of the high-level feature detection section 33, and the detected results from all component section of the intermediate-level feature detection section 32 may be supplied to the CM detection section 33A.

Figure 5:
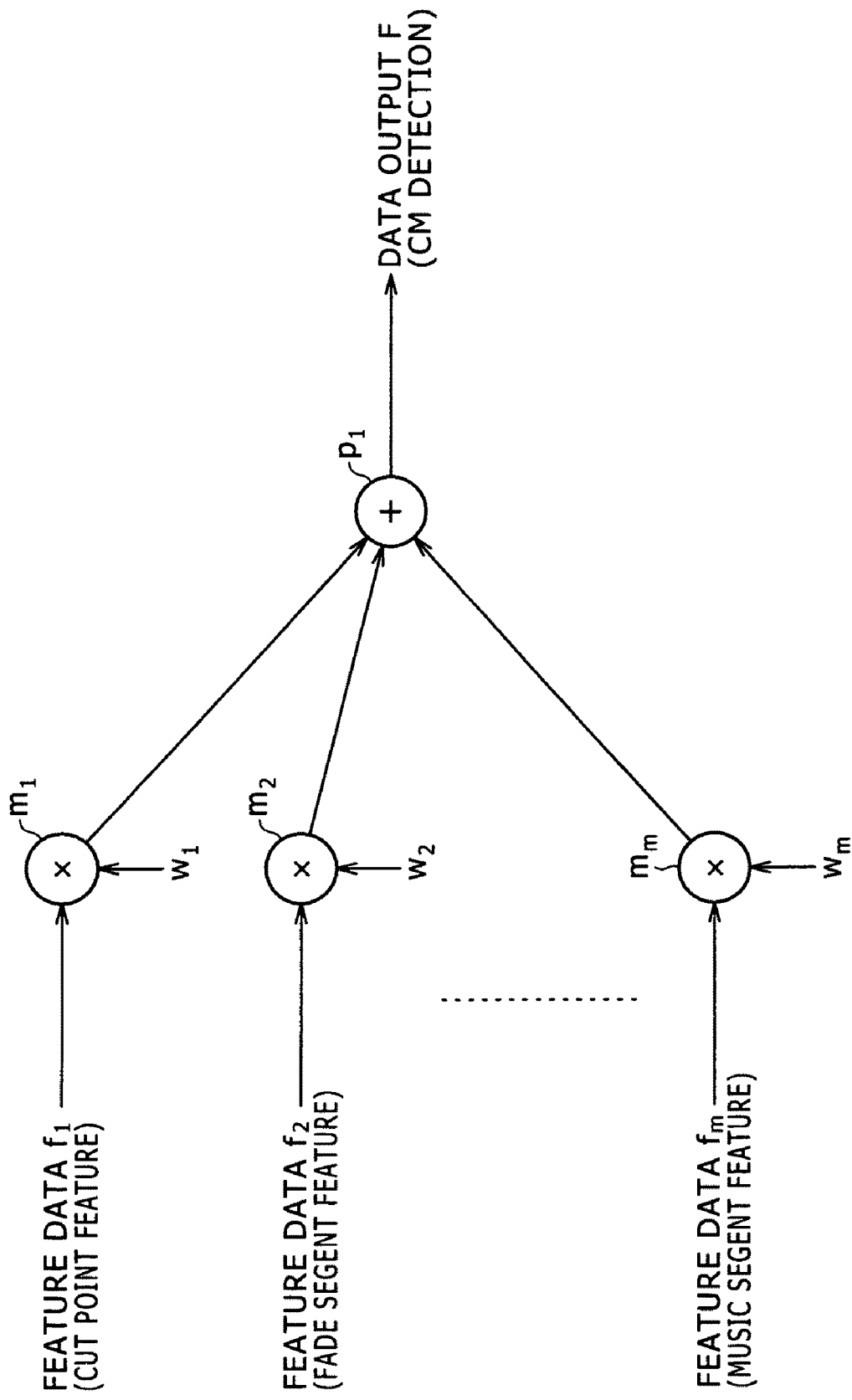
FIG. 5 is a schematic view showing how data items are typically weighted.

FIG. 5 is a schematic view showing how the detected results from the component sections of the intermediate-level feature detection section 32 as well as the detected results from the component sections of the high-level feature detection section 33 are typically weighted.

What follows is an explanation of the weighting process performed upon CM detection by the CM detection section 33A. The weighting process is carried in like manner with the other component sections.

In the example of FIG. 5, feature data $f_1$ representing a cut point feature detected by the cut point detection section 32A is input to a multiplier $m_1$. Feature data $f_2$ denoting a fade segment feature detected by the fade segment detection section 32B is input to a multiplier $m_2$. Feature data $f_m$ indicating a music segment feature detected by the music segment detection section 32H is input to a multiplier $m_m$.

Also in the example of FIG. 5, a weighting factor $w_1$ is set for the multiplier $m_1$; a weighting factor $w_2$ is set for the multiplier $m_2$; and a weighting factor $w_m$ is set for the multiplier $m_m$.

It is assumed that the weighting factors determined for the multipliers were acquired through learning upon development of the signal processing apparatus 1. The weighting factors may later be renewed by updates of the firmware in the signal processing apparatus 1.

The multiplier $m_1$ multiplies the feature data $f_1$ by the weighting factor $w_1$, and outputs the multiplied result to an adder $p_1$. The multiplier $m_2$ multiplies the feature data $f_2$ by the weighting factor $w_2$, and outputs the multiplied result to the adder $p_1$. The multiplier $m_m$ multiplies the feature data $f_m$ by the weighting factor $w_m$, and outputs the multiplied result to the adder $p_1$.

The adder $p_1$ compares a predetermined threshold value $F_{th}$ with a value F obtained by adding up the multiplied results from the multipliers involved, so as to determine whether or not the value F is larger than the threshold value $F_{th}$. If the value F is found to be larger than the threshold value $F_{th}$, then the adder $p_1$ determines that the segment in question is a CM segment. The adder $p_1$ proceeds to output the detected result indicating that a CM segment has been detected.

In the case above, the likelihood of correct output may be calculated and outputted based on the value F and on the weighting factors acquired previously through learning. Illustratively, if the final output (also called the converged output value, to be described later) obtained during learning for CM detection is assumed to be 100 and if the output value upon actual detection turns out to be 70, than the likelihood of correct CM detection is evaluated to be 70 percent.

Returning to the explanation of FIG. 4, if the user selects the automatic chapter creation mode for processing, then the automatic chapter creation section 34A of the operation mode execution section 34 sets chapters automatically to suitable positions in the content of interest based on the detected results coming from the component sections of the high-level feature detection section 33.

For example, the automatic chapter creation section 34A sets chapters automatically to the starting and ending positions of each CM segment detected by the CM detection section 33A as well as to the starting and ending positions of each highlight segment detected by the highlight segment detection section 33D. If no CM segment is detected by the CM detection section 33A or if no highlight segment is detected by the highlight segment detection section 33D, then the automatic chapter creation section 34A sets chapters at predetermined intervals.

If the user selects the label image creation mode for processing, then the label image creation section 34B creates a label image of the content of interest based on the detected results coming from the component sections of the high-level feature detection section 33.

For example, the label image creation section 34B may create a label image in which diverse items are suitably arranged, including a frame showing the faces detected by the face detection section 33C; key frames detected by the key frame detection section 33E; and text information such as the title of the content, the broadcast date and time, and the channel number acquired from the EPG data recorded in the recording device 19.

Figure 6A:
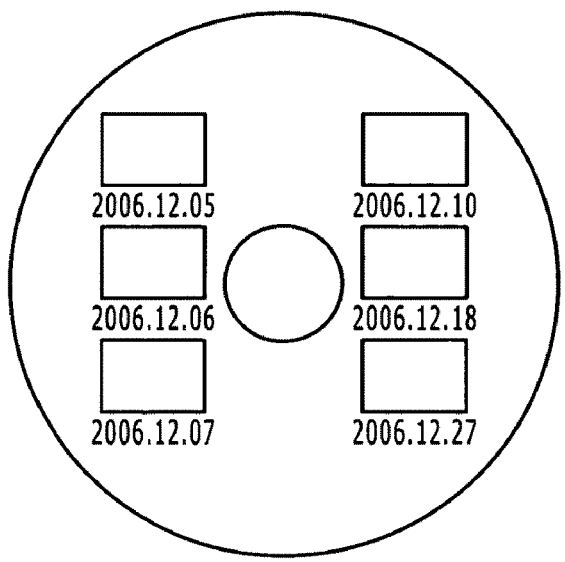
FIGS. 6A, 6B and 6C are schematic views of typical label images.
Figure 6B:
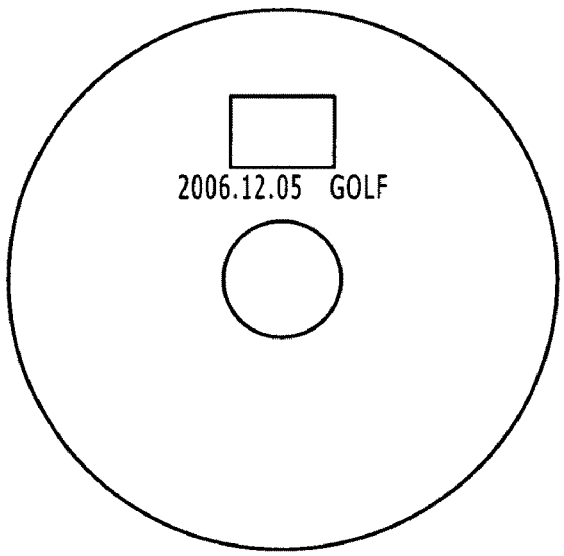
Figure 6C:
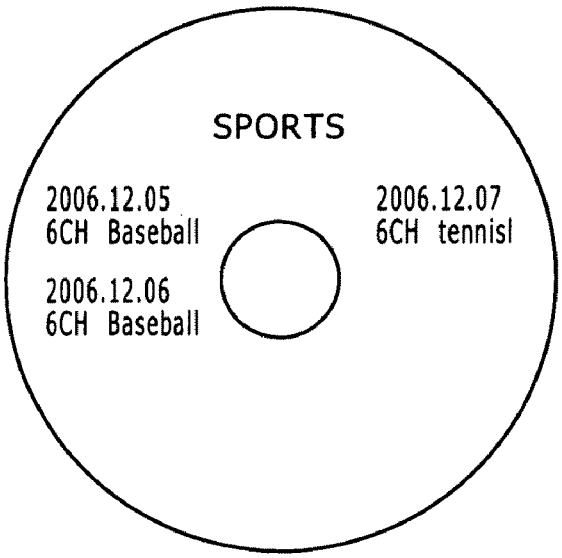

FIGS. 6A, 6B and 6C are schematic views indicating typical label images.

FIG. 6A shows a "mode A" label image that includes a plurality of images and text information. FIG. 6B indicates a "mode B" label image that includes a single image and text information. FIG. 6C depicts a "mode C" label image including text information only. In FIGS. 6A and 6B, rectangular boxes represent an image each. The text information in FIGS. 6A through 6C is illustratively information derived from EPG data.

The user may be allowed to select any one of the three modes of label images above. Alternatively, the operation mode determination section 37 may determine which mode is best suited for the content of interest based on the detected results from the high-level feature detection section 33, and may present the mode thus determined to the user for selection.

For example, if the label image is set to be created using key frame images and if the key frame detection section 33E has detected a plurality of key frames, then the mode A is found to be suitable. If the key frame detection section 33E has detected only one key frame, then the mode B is found suitable. If the key frame detection section 33E has detected no key frame, then mode C is found suitable.

If the user selects the digest reproduction mode for processing, then the digest reproduction section 34C compresses the content of interest for reproduction within a predetermined time period based on the detected results from the component sections of the high-level feature detection section 33, and reproduces the content in digest form. During digest reproduction, the digest reproduction section 34C reproduces segments in such a manner that the user can grasp an outline of the entire content.

FIG. 7 is a schematic view showing typical segments targeted for digest reproduction.

In the example of FIG. 7, each rectangular box represents a segment made up of a predetermined number of frames. The key frame detection section 33E is assumed to have found that segments numbered 1 through 3 contain key frames each. In this case, the digest reproduction section 34C performs digest reproduction of the segments 1 through 3 as indicated by a downward-pointing arrow in FIG. 7.

Alternatively, the people segments detected by the people detection section 33F may be arranged to be reproduced in digest form. If the information about the speech segments detected by the speech segment detection section 32G is sent to the digest reproduction section 34C as well, then the speech segments may be arranged to be reproduced in digest form.

If a content as short as about one minute is further compressed into an extremely short time digest form with a reproduction time (recording time) of 10 seconds, it is virtually impossible for the user to grasp the summarized outline. This inconvenience may be averted by the operation mode determination section 37 automatically determining tolerable compression rates in keeping with content reproduction times whenever the user selects the digest reproduction mode for processing. The compression rates determined as selectable may then be presented to the user for selection.

Figure 8:
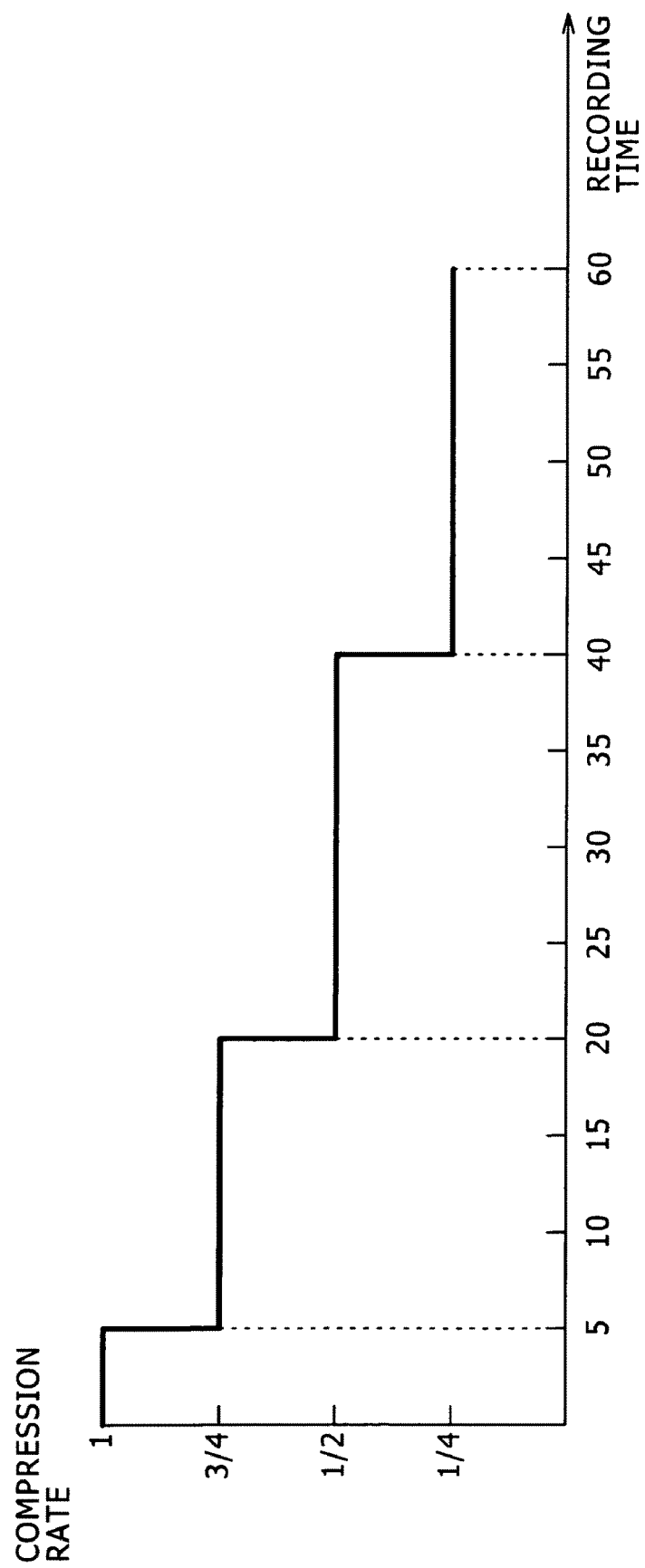
FIG. 8 is a graphic representation indicating typical compression rates for contents that are targeted for digest reproduction.

FIG. 8 is a graphic representation indicating typical compression rates for contents.

In FIG. 8, the horizontal axis stands for content recording times and the vertical axis for compression rates. In the example of FIG. 8, the compression rate is shown to be 1 for contents that have recording times of up to five minutes. That is, such short contents are not allowed for digest reproduction. Contents that have recording times of five to twenty minutes are permitted for digest reproduction at a compression rate of ¾, as indicated.

It is also shown that contents with recording times of 20 to 40 minutes are allowed for digest reproduction at a compression rate of ½. Contents that have recording times of 40 to 60 minutes are permitted for digest reproduction at a compression rate of ¼ as indicated.

For example, if the content targeted for digest reproduction has a reproduction time of 60 minutes, then three compression rates, ¾, ½ and ¼, may be presented to the user. The user may then select any one of the presented compression rates for digest reproduction.

If the user selects the automatic title creation mode for processing, then the automatic title creation section 34D shown in FIG. 4 creates automatically a title for the target content based on the detected results coming from the component sections of the high-level feature detection section 33.

If the user selects the automatic editing mode for processing, then the automatic editing section 34E performs cut editing of the target content based on the detected results coming from the component sections of the high-level feature detection section 33.

Figure 9:
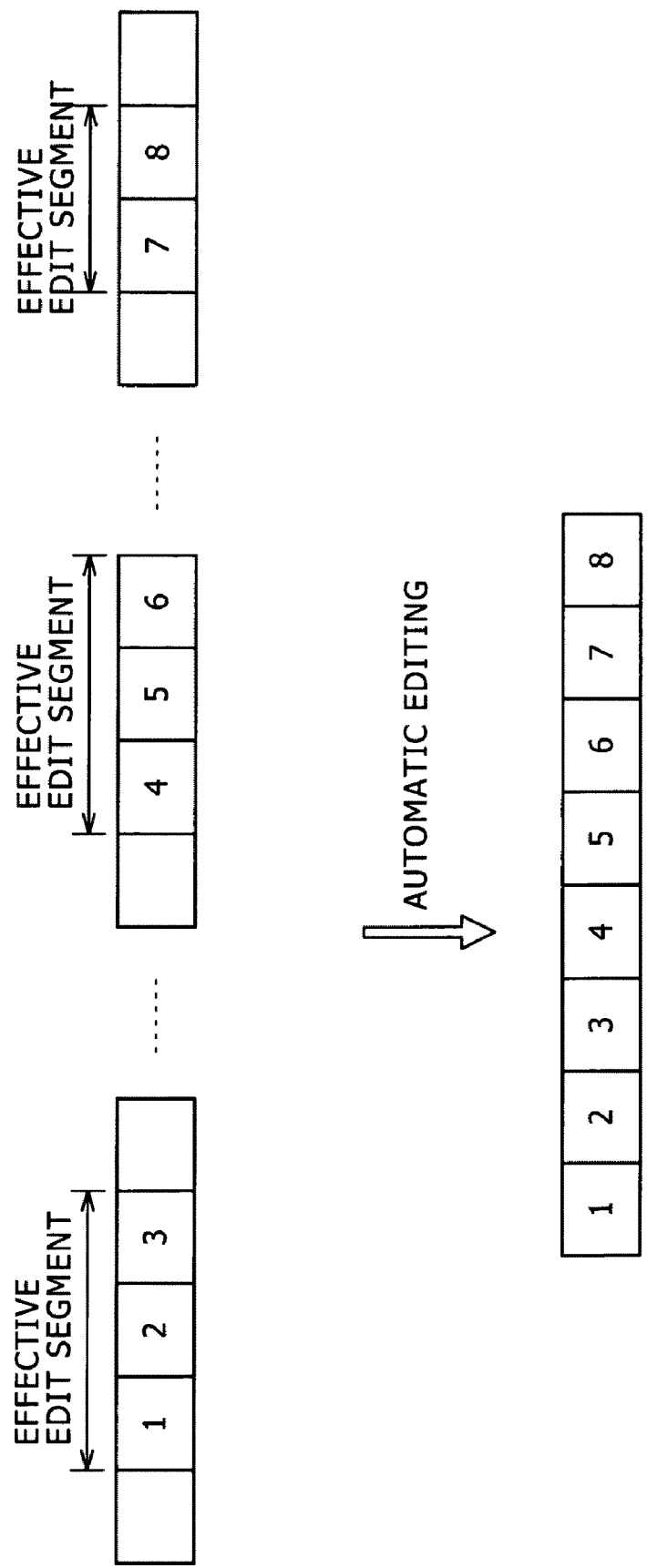
FIG. 9 is a schematic view showing an example of cut editing.

FIG. 9 is a schematic view showing an example of cut editing.

In FIG. 9, each rectangular box represents a segment made up of a predetermined number of frames as in previous examples. In the example of FIG. 9, the automatic editing section 34E is assumed to have determined that segments numbered 1 through 3, segments numbered 4 through 6, and segments numbered 7 and 8 are effective edit segments.

In the case above, by the automatic editing section 34E, only the images of the effective edit segments are cut out for editing as indicated by a downward-pointing arrow in FIG. 9. It is allowed to insert visual effects such as a cross-fade between the segment 3 and the segment set 4, as well as between the segment 6 and the segment 7 if so desired.

For example, the segments detected by the face detection section 33C as containing people's faces are determined as effective edit segments. Where contents obtained by a home-use camcorder and imported into the signal processing apparatus 1 are targeted for cut editing, they are likely to contain numerous segments with people's faces. In that case, it is considered effective to cut out the segments including people's faces for editing.

There may be provided two modes in which to determine effective edit segments: a face-centered editing mode and a normal mode (default editing mode). In the face-centered editing mode, the segments with people's faces are considered effective edit segments. In the default editing mode, about as many segments with people's faces as the segments without them are selected to be effective edit segments.

One of the two modes for cut editing may be selected manually by the user after the automatic editing mode is designated. Alternatively, the automatic editing section 34E may automatically select one of the two modes in accordance with the length of time in which people have been detected. For example, if the time ratio of the segments with detected people to the entire reproduction time of the content is found to be higher than a predetermined threshold value, then the face-centered editing mode may be selected. If the ratio is found lower than the threshold value, then the normal mode may be selected.

The weighting factor setting section 35 in FIG. 4 reads suitable weighting factors from the weighting factor database 36 in accordance with the target genre of contents or according to the target content itself. The retrieved weighting factors are set to the component sections of the intermediate-level feature detection section 32 and to those of the high-level feature detection section 33. Different weighting factors are established every time the content or the genre of contents being targeted is changed.

Given the detected results from the component sections of the high-level feature detection section 33, the operation mode determination section 37 selects operation modes for the user to choose from regarding the content being targeted. Specifically, the operation mode determination section 37 controls the output device 18 to display an appropriate image such as one in FIG. 2 on the TV set 2 so that the user can choose one of the selectable operation modes being displayed.

What follows is a description of how weighting factors are learned by an apparatus.

Figure 10:
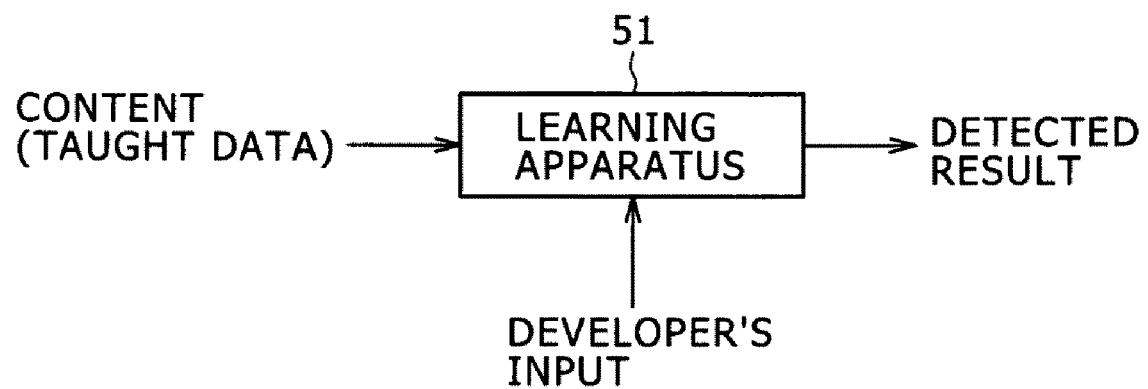
FIG. 10 is a schematic view outlining a learning apparatus.

FIG. 10 is a schematic view outlining a learning apparatus 51 for learning the weighting factors.

The learning apparatus 51 is typically implemented by a personal computer. Weighting factors are learned by the learning apparatus 51 illustratively during the development of the signal processing apparatus 1.

As shown in FIG. 10, contents that serve as taught data are input to the learning apparatus 51. Features are detected from the taught data and the detected results are output for confirmation by apparatus developers. In the confirming process, the developers adjust weighting factors regarding the detected features. Repeated adjustments ultimately provide the weighting factors that are recorded to the weighting factor database 36. The recorded weighting factors are later retrieved for the above-described detection of actual features.

Figure 11:
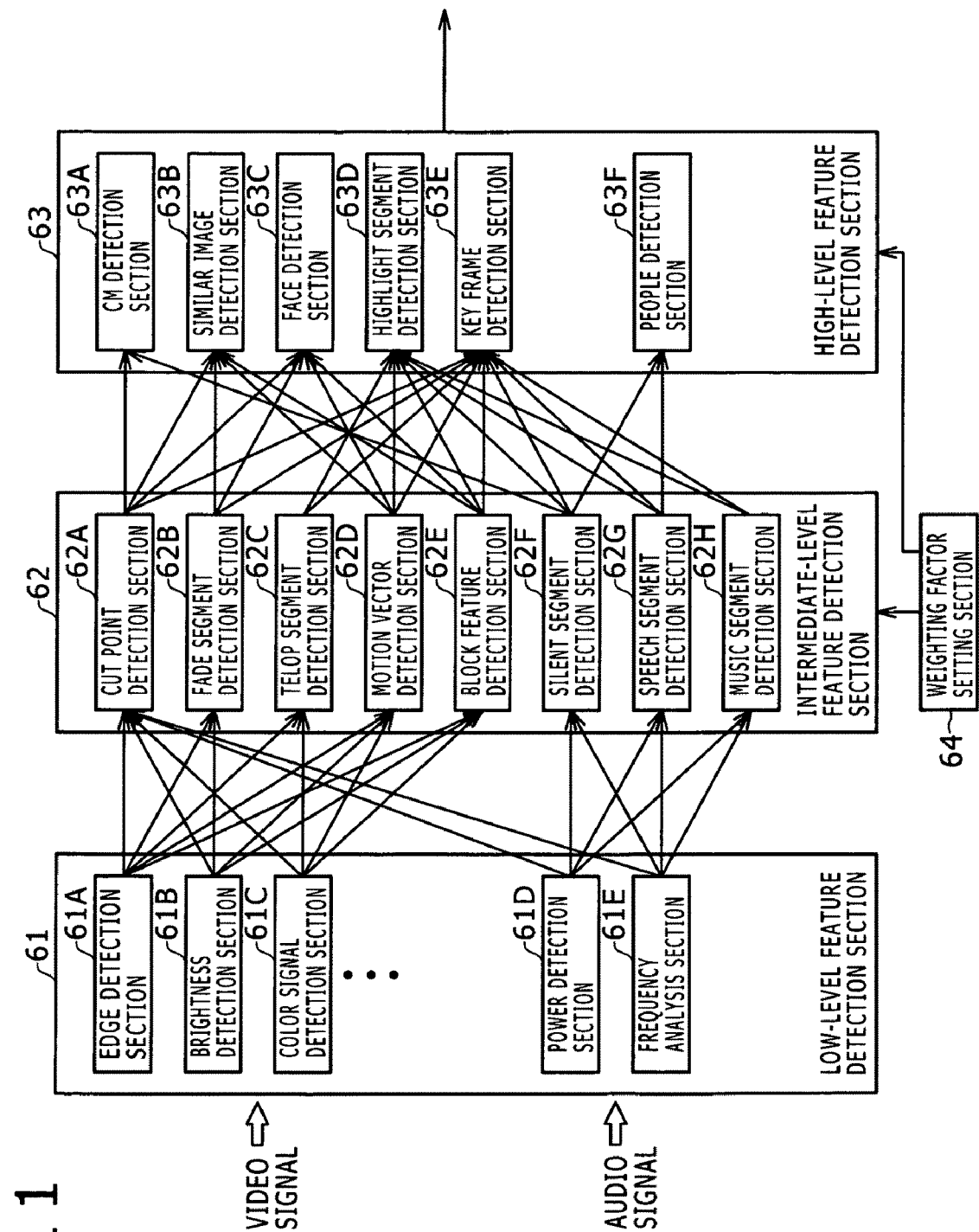
FIG. 11 is a block diagram showing a typical functional structure of the learning apparatus.

FIG. 11 is a block diagram showing a typical functional structure of the learning apparatus 51. At least part of the functional blocks shown in FIG. 11 are implemented by the CPU of the learning apparatus 51 executing appropriate programs.

As shown in FIG. 11, the learning apparatus 51 has a low-level feature detection section 61, an intermediate-level feature detection section 62, and a high-level feature detection section 63 implemented therein in a manner corresponding to the low-level feature detection section 31, intermediate-level feature detection section 32, and high-level feature detection section 33 of the signal processing apparatus 1, respectively. The descriptions of these sections will be omitted hereunder where they overlap and are redundant. It should be noted that a weighting factor setting section 64 is also implemented in the learning apparatus 51.

The component sections of the low-level feature detection section 61, those of the intermediate-level feature detection section 62, and those of the high-level feature detection section 63 correspond respectively to the component sections of the low-level feature detection section 31, those of the intermediate-level feature detection section 32, and those of the high-level feature detection section 33 in the signal processing apparatus 1.

Specifically, an edge detection section 61A in the low-level feature detection section 61 detects edges based on the video signal of the content serving as taught data. The detected results are output by the edge detection section 61A to the component sections ranging from a cut point detection section 62A to a block feature detection section 62E of the intermediate-level feature detection section 62.

A brightness detection section 61B detects brightness levels based on the video signal of the content. The detected results are output by the brightness detection section 61B to the cut point detection section 62A, a fade segment detection section 62B, a motion vector detection section 62D, and the block feature detection section 62E of the intermediate-level feature detection section 62.

A color signal detection section 61C detects color signals of each pixel from the video signal of the content. The detected results are output by the color signal detection section 61C to the cut point detection section 62A, a telop segment detection section 62C, the motion vector detection section 62D, and block feature detection section 62E of the intermediate-level feature detection section 62.

A power detection section 61D detects audio power levels from the audio signal of the content. The detected results are output by the power detection section 61D to the cut point detection section 62A, a silent segment detection section 62F, a speech segment detection section 62G, and a music section detection section 62H of the intermediate-level feature detection section 62.

A frequency analysis section 61E performs frequency analysis on the audio signal of the content in order to detect audio information from different frequency bands. The detected results are output by the frequency analysis section 61E to the cut point detection section 62A, silent segment detection section 62F, speech segment detection section 62G, and music segment detection section 62H of the intermediate-level feature detection section 62.

Based on the weighting factors set by the weighting factor setting section 64, the cut point detection section 62A in the intermediate-level feature detection section 62 assigns weights to the detected results coming from the component sections of the low-level feature detection section 61 in order to detect cut points. The detected results are output by the cut point detection section 62A to a CM detection section 63A, a similar image detection section 63B, a face detection section 63C, and a key frame detection section 63E of the high-level feature detection section 63.

Based on the weighting factors set by the weighting factor setting section 64, the fade segment detection section 62B assigns weights to the detected results coming from the component sections of the low-level feature detection section 61 in order to detect fade segments. The detected results are output by the fade segment detection section 62B to the similar image detection section 63B, face detection section 63C, and key frame detection section 63E of the high-level feature detection section 63.

Based on the weighting factors set by the weighting factor setting section 64, the telop segment detection section 62C assigns weights to the detected results coming from the component sections of the low-level feature detection section 61 in order to detect telop segments. The detected results are output by the telop segment detection section 62C to a highlight segment detection 63D and the key frame detection section 63E of the high-level feature detection section 63.

Based on the weighting factors set by the weighting factor setting section 64, the motion vector detection section 62D assigns weights to the detected results coming from the component sections of the low-level feature detection section 61 in order to detect motion vectors. The detected results are output by the motion vector detection section 62D to the similar image detection section 63B, face detection section 63C, highlight segment detection section 63D, and key frame detection section 63E of the high-level feature detection section 63.

Based on the weighting factors set by the weighting factor setting section 64, the block feature detection section 62E assigns weights to the detected results coming from the component sections of the low-level feature detection section 61 in order to detect block features. The detected results are output by the block feature detection section 62E to the similar image detection section 63B, face detection section 63C, highlight detection section 63D, and key frame detection section 63E of the high-level feature detection section 63.

Based on the weighting factors set by the weighting factor setting section 64, the silent segment detection section 62F assigns weights to the detected results coming from the component sections of the low-level feature detection section 61 in order to detect silent segments. The detected results are output by the silent segment detection section 62F to the CM detection section 63A, highlight segment detection section 63D, key frame detection section 63E, and a people detection section 63F of the high-level feature detection section 63.

Based on the weighting factors set by the weighting factor setting section 64, the speech segment detection section 62G assigns weights to the detected results coming from the component sections of the low-level feature detection section 61 in order to detect speech segments. The detected results are output by the speech segment detection section 62G to the highlight segment detection section 63D, key frame detection section 63E, and people detection section 63F of the high-level feature detection section 63.

Based on the weighting factors set by the weighting factor setting section 64, the music segment detection section 62H assigns weights to the detected results coming from the component sections of the low-level feature detection section 61 in order to detect music segments. The detected results are output by the music segment detection section 62H to the highlight segment detection section 63D and key frame detection section 63E of the high-level feature detection section 63.

Based on the weighting factors set by the weighting factor setting section 64, the CM detection section 63A assigns weights to the detected results coming from the component sections of the intermediate-level feature detection section 62 in order to detect CM segments. The detected results are output by the music segment detection section 63A to the outside.

Based on the weighting factors set by the weighting factor setting section 64, the similar image detection section 63B assigns weights to the detected results coming from the component sections of the intermediate-level feature detection section 62 in order to detect similar images. The detected results are output by the similar image detection section 63B to the outside.

Based on the weighting factors set by the weighting factor setting section 64, the face detection section 63C assigns weights to the detected results coming from the component sections of the intermediate-level feature detection section 62 in order to detect people's faces. The detected results are output by the face detection section 63C to the outside.

Based on the weighting factors set by the weighting factor setting section 64, the highlight detection section 63D assigns weights to the detected results coming from the component sections of the intermediate-level feature detection section 62 in order to detect highlight segments. The detected results are output by the highlight detection section 63D to the outside.

Based on the weighting factors set by the weighting factor setting section 64, the key frame detection section 63E assigns weights to the detected results coming from the component sections of the intermediate-level feature detection section 62 in order to detect key frames. The detected results are output by the key frame detection section 63E to the outside.

Based on the weighting factors set by the weighting factor setting section 64, the people detection section 63F assigns weights to the detected results coming from the component sections of the intermediate-level feature detection section 62 in order to detect the presence or absence of people. The detected results are output by the people detection section 63F to the outside.

As described above, the component sections of the low-level feature detection section 61 are connected to those of the intermediate-level feature detection section 62 in the same manner as the component sections of the low-level feature detection section 31 are connected to those of the intermediate-level feature detection section 32; the component sections of the intermediate-level feature detection section 62 are connected to those of the high-level feature detection section 63 in the same manner as the component sections of the intermediate-level feature detection section 32 are connected to those of the high-level feature detection section 33. The connections between the component sections shown in FIG. 11 may be changed as needed.

The weighting factor setting section 64 sets weighting factors for the component sections of the intermediate-level feature detection section 62 and for the component sections of the high-level feature detection section 63 in accordance with apparatus developers' operations.

Figure 12:
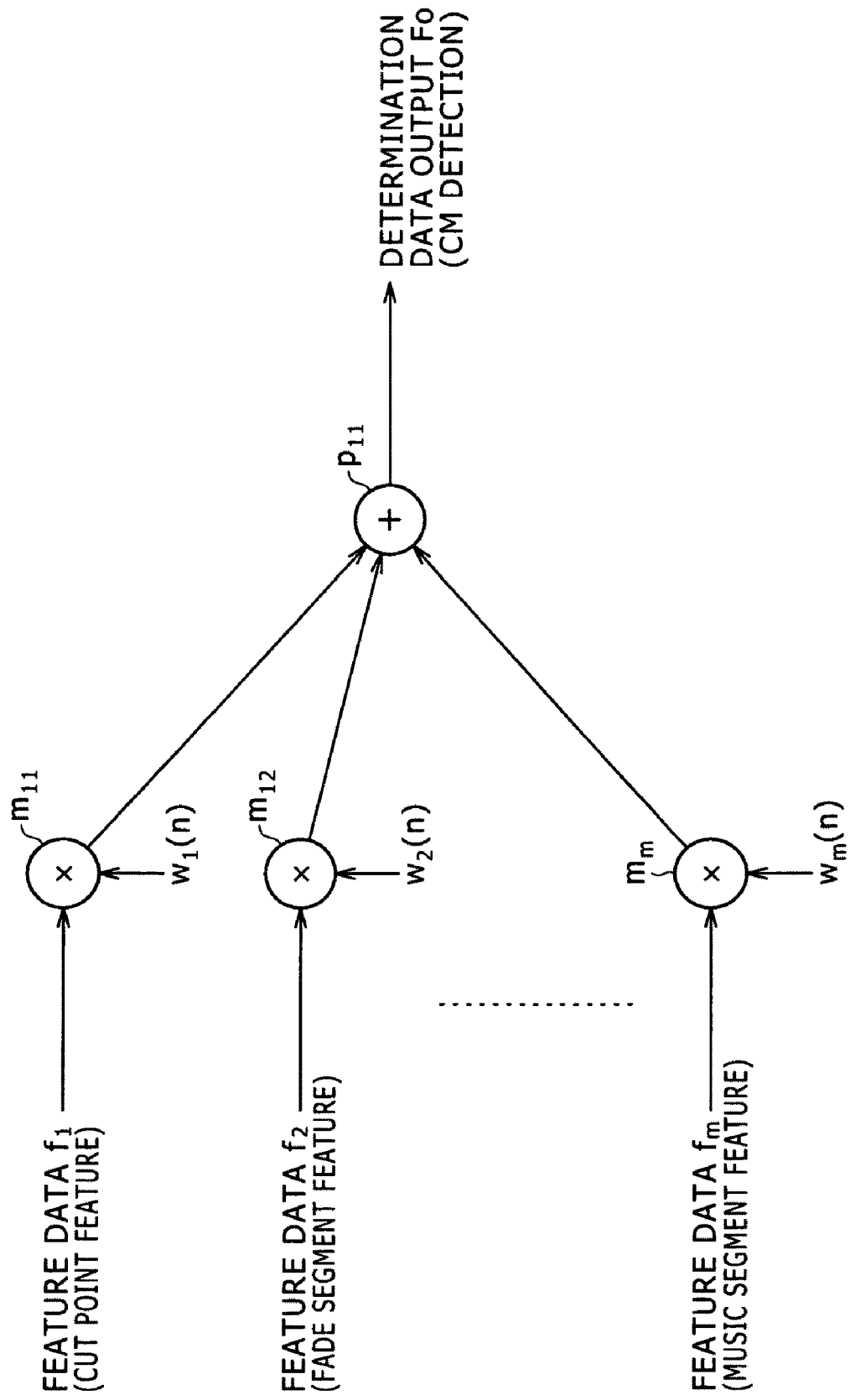
FIG. 12 is a schematic view showing a typical learning process involving weighting factors.

FIG. 12 shows how each component section is typically structured in the intermediate-level feature detection section 62 and in the high-level feature detection section 63.

In the structure of FIG. 12, feature data $f_1$ representing a cut point feature detected by the cut point detection section 62A is input to a multiplier $m_{11}$. Feature data $f_2$ denoting a fade segment feature detected by the fade segment detection section 62B is input to a multiplier $m_{12}$. Feature data $f_m$ representative of a music segment feature detected by the music segment detection section 62H is input to a multiplier $m_M$.

The multiplier $m_{11}$ multiplies the feature data $f_1$ by a weighting factor $w_1(n)$; the multiplier $m_{12}$ multiplies the feature data $f_2$ by a weighting factor $w_2(n)$; and the multiplier $m_M$ multiplies the feature data fm by a weighting factor $w_m(n)$. The multiplied results from the multipliers are fed to an adder $p_{11}$. The adder $p_{11}$ adds up the input results and outputs the sum as a determination data output $F_0$.

In the above structure, the learning of weighting factors takes place as follows:

(1) First, one feature to be detected is selected. In the example of FIG. 12, a CM segment is selected as the feature to be detected. Whereas the process of learning the weighting factor for CM detection is explained here, the same learning process also applies to the process of detecting the weighting factors for other features.

(2) In order to determine the weighting factor $w_1$, a variable weighting factor $w_1(n)$ is set to the multiplier $m_{11}$. The factor that (most likely) maximizes the determination data output $F_0$ is selected as the weighting factor $w_1$, weighting factors $w_2(n), \ldots, w_M(n)$ other than the weighting factor $w_1(n)$ may be set illustratively for a fixed value of 0.5, which may be the default value.

Figure 13:
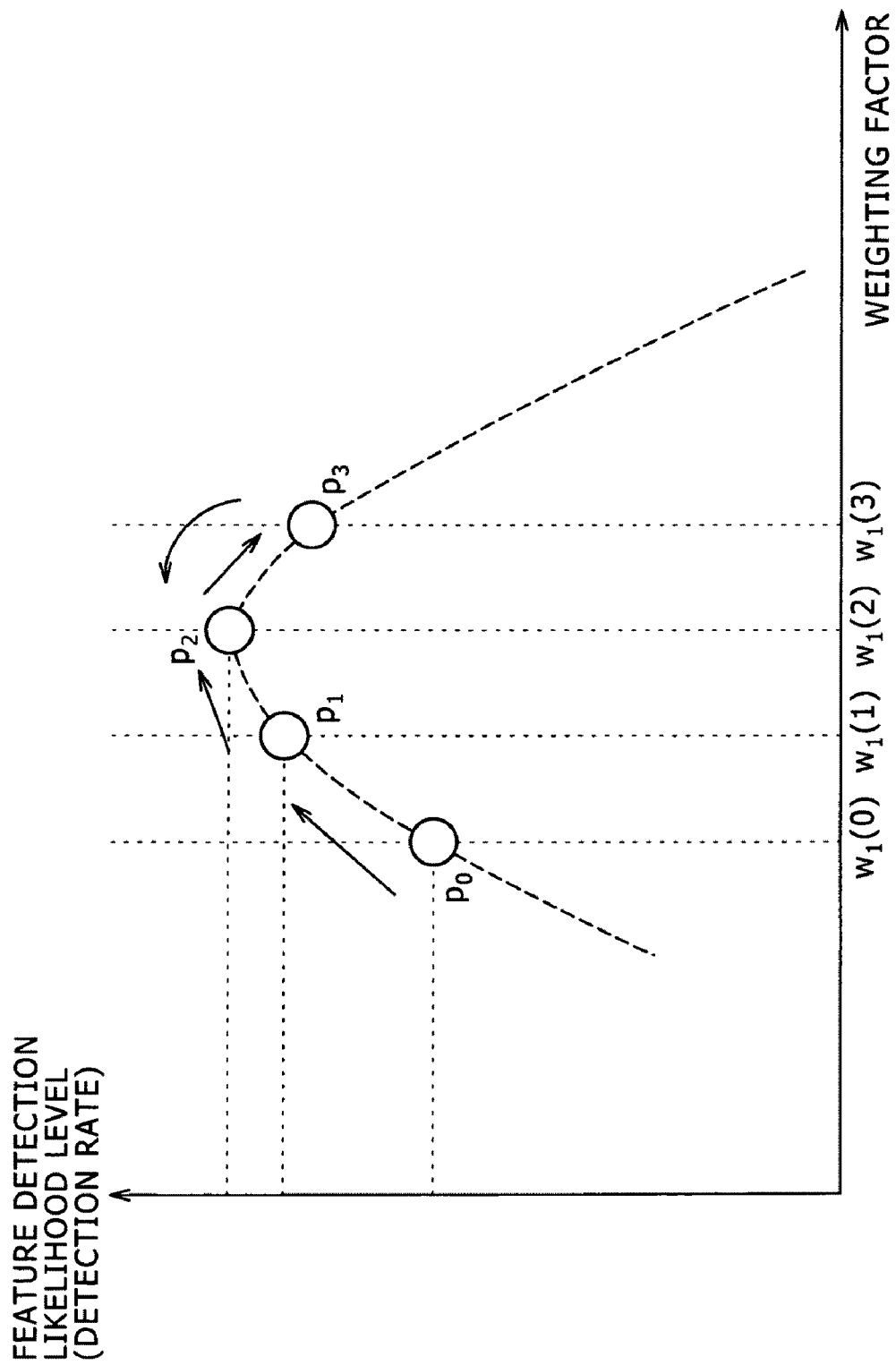
FIG. 13 is a graphic representation showing typical detected levels of determination data output likelihood.

FIG. 13 is a graphic representation showing typical detected levels of determination data output likelihood.

In FIG. 13, the horizontal axis stands for weighting factors and the vertical axis for likelihood levels (i.e., detection rates). The likelihood levels are established illustratively by apparatus developers.

In the example of FIG. 13, reference character $p_0$ denotes the likelihood level of the determination data output $F_0$ in effect when the weighting factor $w_1(0)$ is set as the weighting factor $w_1(n)$. Reference character $p_1$ represents the likelihood level of the determination data output $F_0$ in effect when the weighting factor $w_1(1)$ is set. Reference character $p_2$ stands for the likelihood level of the determination data output $F_0$ in effect when the weighting factor $w(2)$ is set as the weighting factor $w_1(n)$. Reference character $p_3$ indicates the likelihood level of the determination data output $F_0$ in effect when the weighting factor $w_1(3)$ is set.

In the case above, the likelihood level of the determination data output $F_0$ is maximized when the weighting factor $w_1(2)$ is set. For that reason, the weighting factor $w_1(2)$ is selected as the weighting factor $w_1$ to be set to the multiplier $m_{11}$.

(3) Then in order to determine the weighting factor $w_2$, another variable weighting factor $w_2(n)$ is set to the multiplier $m_{12}$. As shown in FIG. 13, the factor that maximizes the output determination data $F_0$ is selected as the weighting factor $w_2$. At this point, the weighting factor $w_1$ selected in step (2) above is set to the multiplier $m_{11}$.

(4) Steps (2) and (3) above are repeated until the weighting factor to be set to the multiplier $m_M$ is selected.

(5) The adjustment performed in steps (1) through (4) above is repeated until the values of the determination data output $F_0$ converge. The values of the determination data output $F_0$ are said to have converged when a determination data output $F_0(k-1)$ derived from a (k−1)th adjustment becomes equal to a determination data output $F_0(k)$ obtained from a k-th adjustment or when the difference between the output $F_0(k-1)$ and the output $F_0(k)$ becomes smaller than a threshold value $\delta_b$. For example, convergence is considered to be achieved when the following expression (3) holds:

$$|F_0(k-1)-F_0(k)| \leq \delta b \qquad (3)$$

There may be cases where the values of the determination data output $F_0$ fail to converge. In such cases, the number of times steps (1) through (4) above are to be repeated may be limited to, say, 1,000.

The learning process above is carried out as described to obtain the weighting factors to be set for the component sections of the intermediate-level feature detection section 62 and for the component sections of the high-level feature detection section 63. The weighting factors acquired through learning are recorded to the weighting factor database 36 as the weighting factors for subsequent use by the signal processing apparatus 1 upon detection of actual features. The determination data output $F_0$ derived ultimately from the repeated weighting factor adjustments for each of the component sections involved is also recorded to the weighting factor database 36 as reference values $F_X$.

The process of learning weighting factors is performed using a plurality of contents and contents in different genres as taught data. The weighting factors are thus learned with regard to the multiple contents in the diverse genres before they are recorded to the weighting factor database 36.

Figure 14:
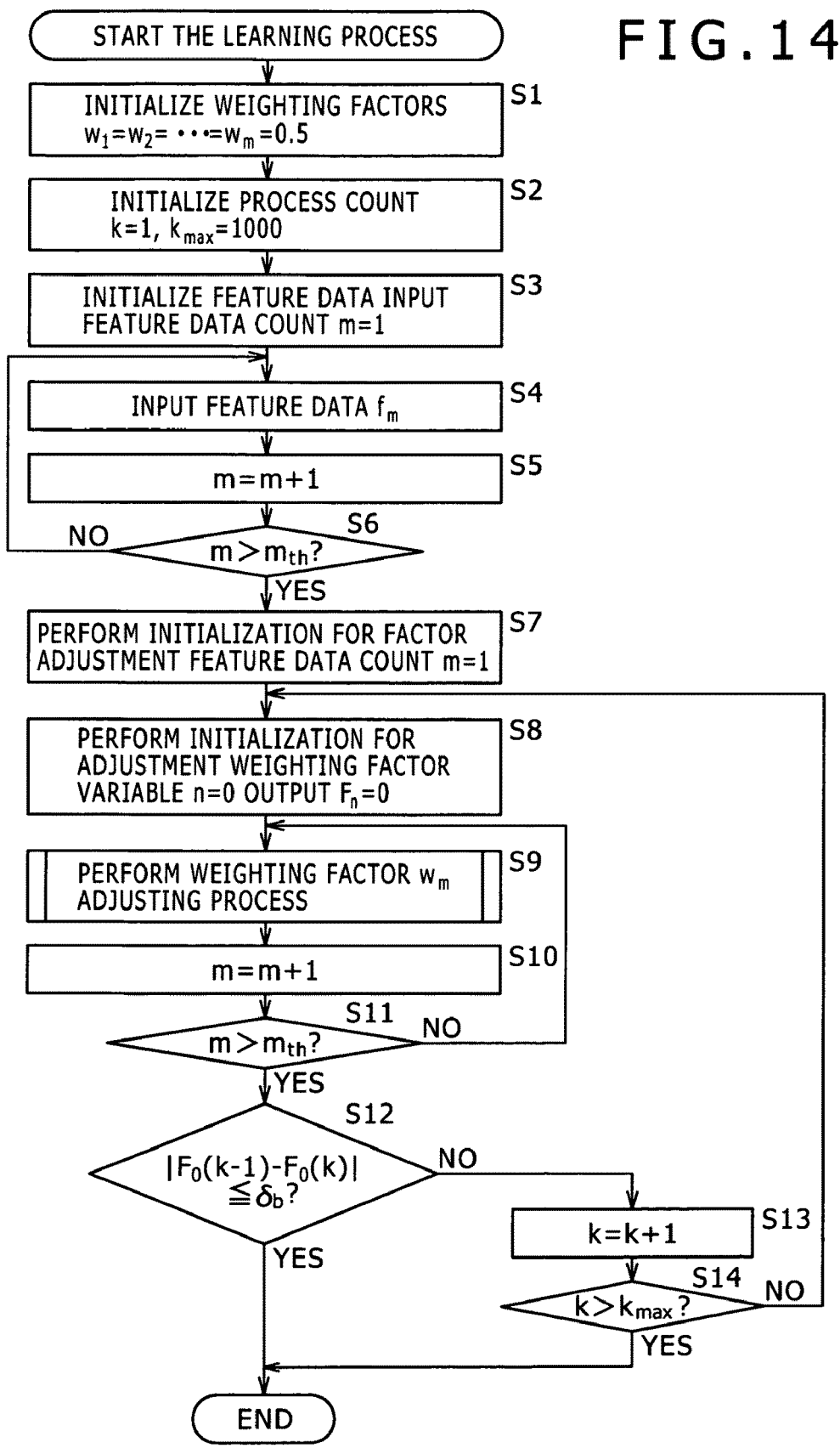
FIG. 14 is a flowchart of steps constituting a learning process performed by the learning apparatus.

Described below in reference to the flowchart of FIG. 14 is a typical learning process carried out by the learning apparatus 51.

The process here involves learning the weighting factor for use in detecting CM segments. The same process also applies to the process of learning weighting factors for detecting other features.

In step S1, the weighting factor setting section 64 initializes weighting factors, setting illustratively a fixed value of 0.5 as the weighting factor for each of the multiplexers configured.

In step S2, the weighting factor setting section 64 initializes the process count, setting an initial iteration value "k" to 1 and a maximum iteration value $k_{max}$ to 1,000.

In step S3, the weighting factor setting section 64 initializes feature data input, setting the value "m" to 1.

In step S4, the weighting factor setting section 64 inputs feature data $f_m$ to a multiplexer. Where the value "m" is 1 immediately after initialization, the feature data $f_1$ representing the detected result of a cut point is input to the multiplier $m_{11}$ shown in FIG. 12.

In step S5, the weighting factor setting section 64 increments the value "m" by 1.

In step S6, the weighting factor setting section 64 determines whether or not the value "m" has exceeded a threshold value $m_{th}$. The threshold value $m_{th}$ represents the number of all multipliers.

If in step S6 the value "m" is not found to have exceeded the threshold value $m_{th}$, then the weighting factor setting section 64 returns to step S4. The input of feature data is then repeated.

If in step S6 the value "m" is found to have exceeded the threshold value $m_{th}$ following completion of the input of all feature data to the multipliers, then step S7 is reached. In step S7, the weighting factor setting section 64 performs initialization for the weighting factor adjustment, setting the value "m" to 1.

In step S8, the weighting factor setting section 64 initializes a weighting factor variable "n" as well as a determination data output $F_n$ to zero.

In step S9, a weighting factor ($w_m$) adjusting process is carried out. This process involves executing the steps discussed above in reference to FIG. 12 before selecting the weighting factor $w_m$. The weighting factor adjusting process of step S9 will be described later in reference to the flowchart of FIG. 15.

In step S10, the weighting factor setting section 64 increments the value "m" by 1.

In step S11, the weighting factor setting section 64 checks to determine whether the value "m" has exceeded the threshold value $m_{th}$.

If in step S11 the value "m" is not found to have exceeded the threshold value $m_{th}$, then the weighting factor setting section 64 returns to step S9 and repeats the weighting factor ($w_m$) adjusting process.

If in step S11 the value "m" is found to have exceeded the threshold value $m_{th}$ following completion of the adjustment of all weighting factors, then step S12 is reached. In step S12, the weighting factor setting section 64 determines whether or not the expression (3) shown above holds, i.e., whether the values of the determination data output $F_0$ have converged.

If in step S12 the values of the determination data output $F_0$ are not found to have converged, then step S13 is reached. In step S13, the weighting factor setting section 64 increments the value "k" by 1.

In step S14, the weighting factor setting section 64 determines whether or not the value "k" has exceeded the maximum iteration value $k_{max}$.

If in step S14 the value "k" is not found to have exceeded the maximum value $k_{max}$, control is returned to step S8. The weighting factor setting section 64 then repeats the subsequent steps.

If in step S14 the valued "k" is found to have exceeded the maximum iteration value $k_{max}$, or if in step S12 the values of the determination data output $F_0$ are found to have converged, then the weighting factor setting section 64 terminates the learning process.

Figure 15:
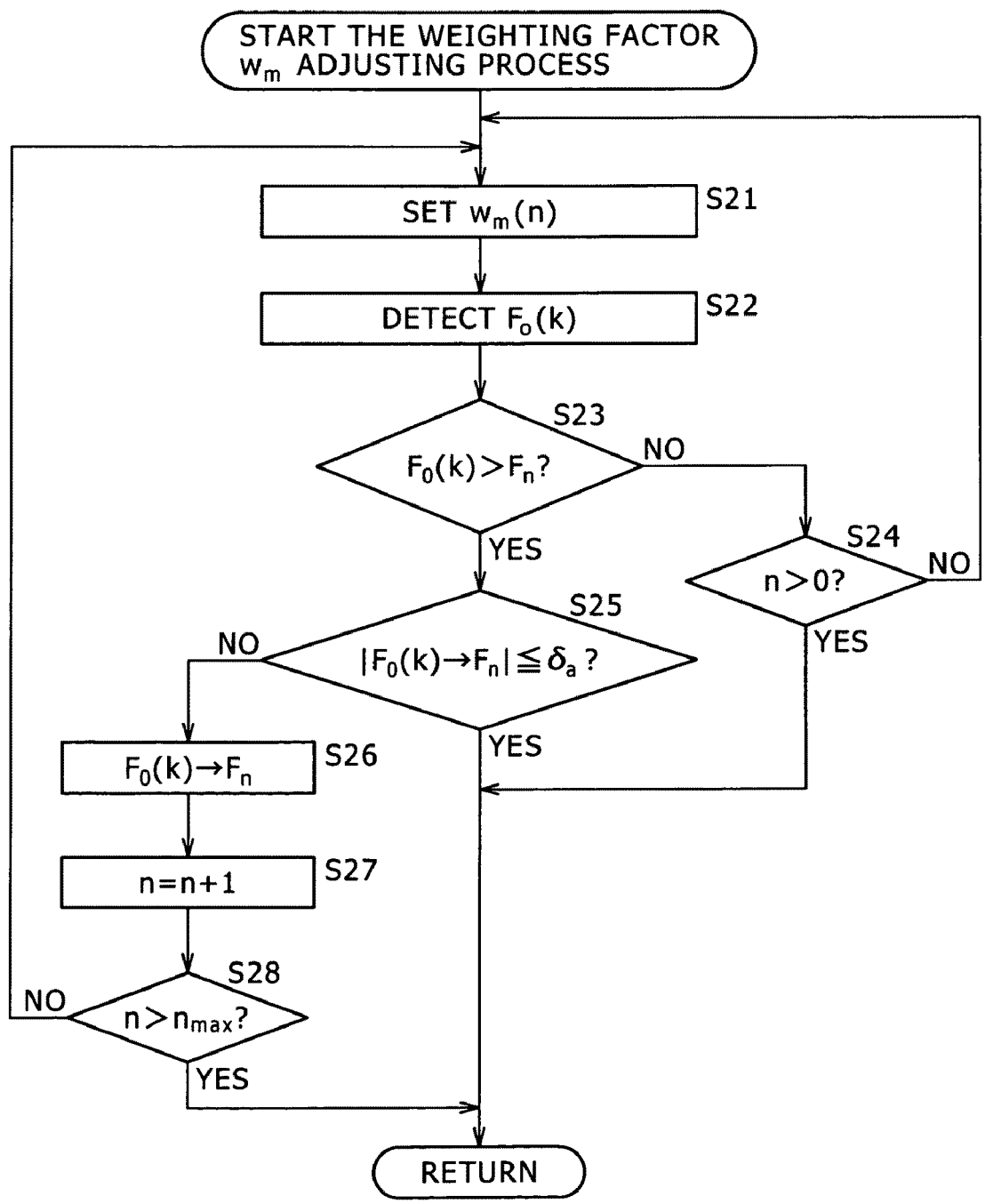
FIG. 15 is a flowchart of steps constituting a weighting factor adjusting process performed in step S9 of FIG. 14.

The weighting factor ($w_n$) adjusting process performed in step S9 of FIG. 14 will now be described below by referring to the flowchart of FIG. 15.

In step S21, the weighting factor setting section 64 sets the variable weighting factor $w_m(n)$ using the current value "n."

In step S22, the weighting factor setting section 64 detects a determination data output $F_0(k)$.

In step S23, the weighting factor setting section 64 checks to determine whether or not the determination data output $F_0(k)$ has exceeded the value $F_n$.

If in step S23 the determination data output $F_0(k)$ is not found to have exceeded the value $F_n$, then step S24 is reached. In step S24, the weighting factor setting section 64 checks to determine whether or not the value "n" has exceeded zero.

If in step S24 the value "n" is not found to have exceeded zero, control is returned to step S21. The weighting factor setting section 64 then repeats the subsequent steps.

If in step S23 the determination data output $F_0(k)$ is found to have exceeded the value $F_n$, then step S25 is reached. In step S25, the weighting factor setting section 64 determines whether or not the difference between the determination data output $F_0(k)$ detected in step S22 and the value $F_n$ has become equal to or smaller than a threshold value $\delta_a$, i.e., whether or not the following expression (4) holds:

$$|F_0(k) - F_n(k)| \leq \delta a \quad (4)$$

If in step S25 the above expression (4) is not found to hold, then step S26 is reached. In step S26, the weighting factor setting section 64 establishes the current determination data output $F_0(k)$ as the value $F_n$.

In step S27, the weighting factor setting section 64 increments the value "n" by 1.

In step S28, the weighting factor setting section 64 determines whether or not the value "n" has exceeded a predetermined maximum value $n_{max}$.

If in step S28 the value "n" is not found to have exceeded the maximum value $n_{max}$, control is returned to step S21. The weighting factor setting section 64 then repeats the subsequent steps.

If in step S28 the value "n" is found to have exceeded the maximum value $n_{max}$, if in step S25 the above expression (4) is found to hold, or if in step S24 the value "n" is found to be larger than zero, then the weighting factor setting section 64 proceeds to carry out the steps subsequent to step S9 in FIG. 14.

The learning of weighting factors is accomplished as described above. After the weighting factors obtained through learning have been recorded to the weighting factor database 36, the signal processing apparatus 1 detects actual features and, based on the detected features, presents the user with selectable operation modes.

Figure 16:
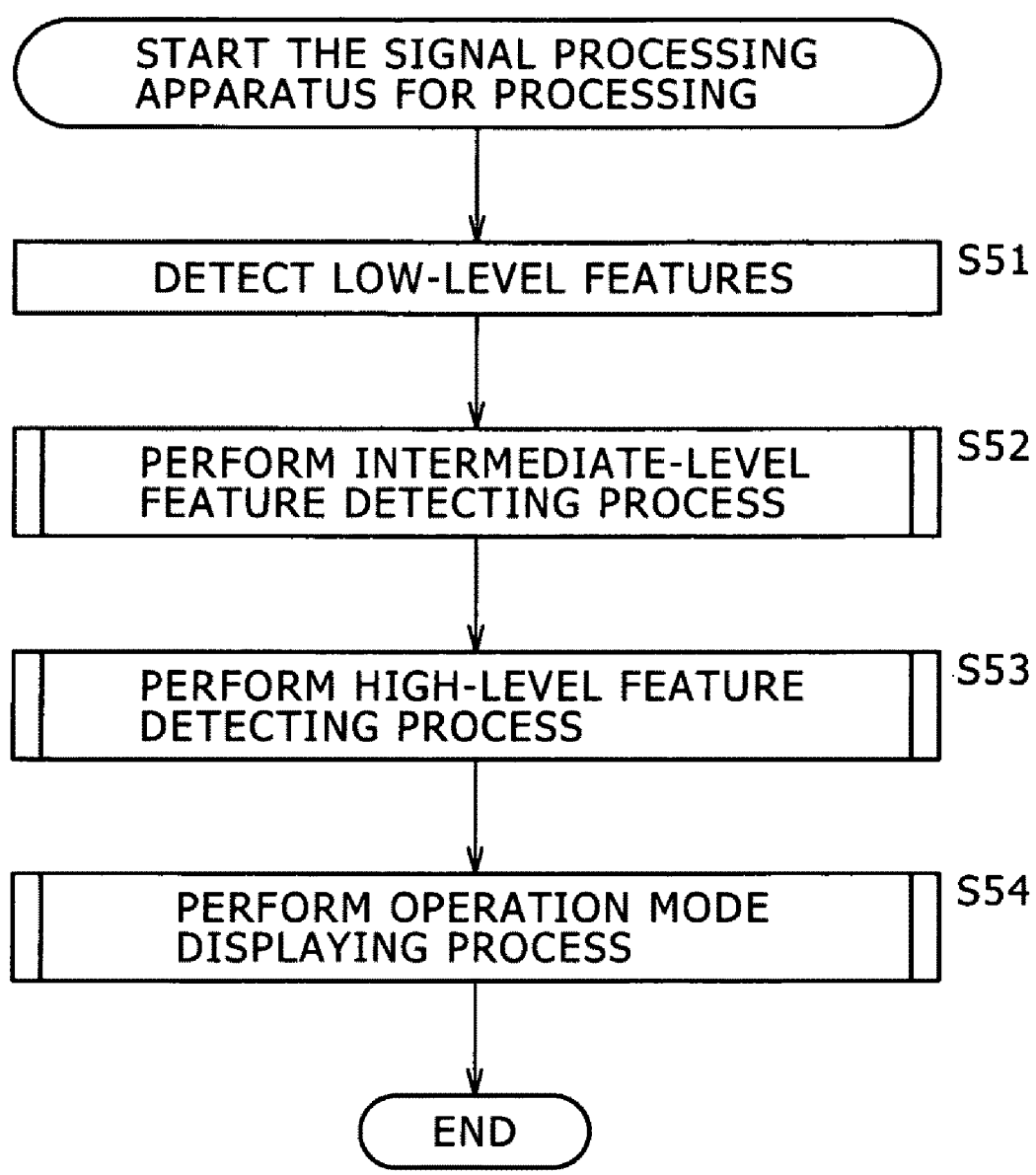
FIG. 16 is a flowchart of steps constituting processing performed by the signal processing apparatus.

Described below in reference to the flowchart of FIG. 16 is how the signal processing apparatus 1 carries out its process. This process is started illustratively upon completion of the recording of a content. The video and audio signals of the target content to be processed (e.g., content that has just been recorded) are input sequentially to the low-level feature detection section 31 whereby features are detected at predetermined intervals of data.

In step S51, the component sections of the low-level feature detection section 31 analyze the video and audio signals of the target content in order to detect low-level features. The detected results from the component sections of the low-level feature detection section 31 are output to the intermediate-level feature detection section 32.

In step S52, the intermediate-level feature detection section 32 performs the process of detecting intermediate-level features. The detected results derived from the intermediate-level feature detecting process are output to the high-level feature detection section 33.

In step S53, the high-level feature detection section 33 performs the process of detecting high-level features. The detected results obtained by the high-level feature detecting process are output to the operation mode execution section 34 and operation mode determination section 37. The detected results output to the operation mode determination section 37 are retained by that section, to be used subsequently for selecting operation modes to be presented to the user when a given content is selected by the user.

The intermediate-level feature detecting process performed in step S52 and the high-level feature detecting process in step S53 will be discussed later in reference to the flowchart of FIG. 17.

In step S54 of FIG. 16, the operation mode determination section 37 performs an operation mode displaying process, presenting the user with selectable operation modes. Thereafter, the signal processing apparatus terminates its processing. The operation mode displaying process to be carried out in step S54 will be discussed later in reference to the flowchart of FIG. 18.

Figure 17:
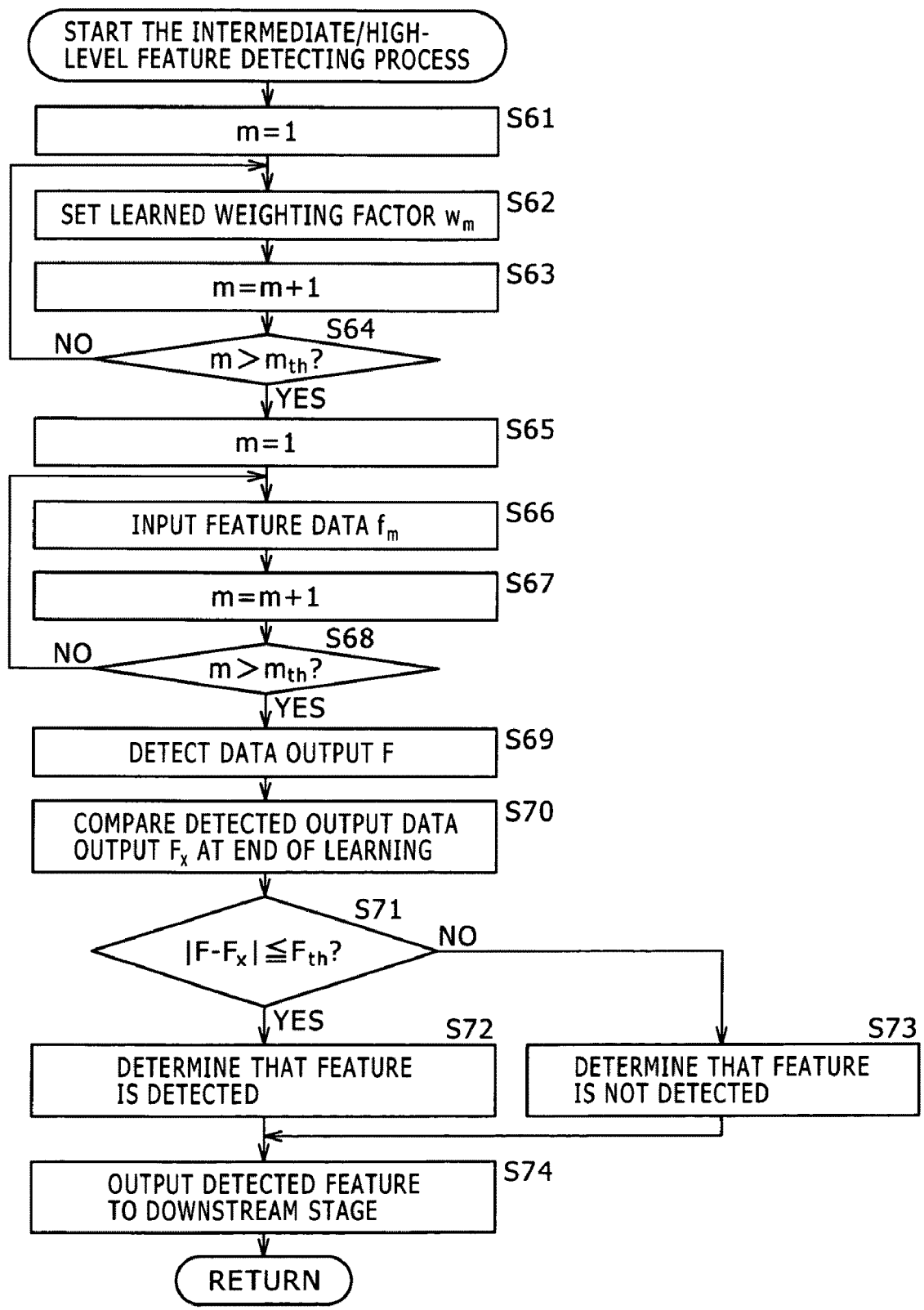
FIG. 17 is a flowchart of steps constituting an intermediate-level feature detecting process performed in step S52 of FIG. 16 and a high-level feature detecting process carried out in step S53 of FIG. 16.

Described below in reference to the flowchart of FIG. 17 are the intermediate-level feature detecting process in step S52 of FIG. 16 and the high-level feature detecting process in step S53.

The steps similar to those in FIG. 17 are carried out by each of the component sections of the intermediate-level feature detection section 32 and high-level feature detection section 33. Whereas the process performed by the CM detection section 33A of the high-level feature detection section 33 is explained here, the same kind of process also applies to the other component processes. At the start of the feature detecting process, the weighting factor setting section 35 supplies the CM detection section 33A with learned weighting factors for use in CM detection.

In step S61, the CM detection section 33A sets the value "m" to 1. As described above in reference to FIG. 5, each of the component sections of the intermediate-level feature detection section 32 and high-level feature detection section 33 has as many as "m" multipliers and one adder. The multiplier of interest is selected according to the value "m."

In step S62, the CM detection section 33A selects the weighting factor $w_m$ out of the weighting factors supplied by the weighting factor setting section 35 and sets the weighting factor $w_m$ to the multiplier of interest.

In step S63, the CM detection section 33A increments the value "m" by 1.

In step S64, the CM detection section 33A checks to determine whether or not the value "m" has exceeded the threshold value $m_{th}$.

If in step S64 the value "m" is not found to have exceeded the threshold value $m_{th}$, control is returned to step S62. The CM detection section 33A then repeats the setting of the weighting factor.

If in step S64 the value "m" is found to have exceeded the threshold value $m_{th}$ following completion of the setting of all weighting factors, then step S65 is reached. In step S65, the CM detection section 33A sets the value "m" to 1.

In step S66, the CM detection section 33A inputs the feature data $f_m$ to the multiplier of interest. Where the value "m" is 1, the feature data $f_1$ representing a detected cut point feature is input to the multiplier "$m_1$" in FIG. 5. In turn, the multiplier "$m_1$" multiplies the input feature data by the weighting factor and outputs the multiplied result to the adder $p_1$.

In step S67, the CM detection section 33A increments the value "m" by 1.

In step S68, the CM detection section 33A determines whether or not the value "m" has exceeded the threshold value $m_{th}$.

If in step S68 the value "m" is not found to have exceeded the threshold value $m_{th}$, control is returned to step S66. The CM detection section 33A then repeats feature data input.

If in step S68 the value "m" is found to have exceeded the threshold value $m_{th}$ following completion of the input of all feature data, then step S69 is reached. In step S69, the CM detection section 33A causes the adder $p_1$ to add up the multiplied results coming from the multipliers so as to detect a data output value F.

In step S70, the CM detection section 33A compares the detected value F with the reference value $F_x$ stored upon completion of the learning process.

In step S71, the CM detection section 33A determines whether or not the absolute value of the difference between the detected value F and the reference value $F_x$ is equal to or smaller than a predetermined threshold value $F_{th}$.

If in step S71 the absolute value of the difference between the value F and the value $F_x$ is found to be equal to or smaller than the value $F_{th}$, then step S72 is reached. In step S72, the CM detection section 33A determines that the segment being processed contains the target to be detected (i.e., a CM).

If in step S71 the absolute value of the difference between the value F and the value $F_x$ is not found to be equal to or smaller than the value $F_{th}$, then step S73 is reached. In step S73, the CM detection section 33A determines that the currently processed segment does not include any CM.

In step S74, the CM detection section 33A outputs the determined result from step S72 or S73 to the operation mode execution section 34 and operation mode determination section 37 located downstream. After the process described above is performed on all segments making up the content being processed, control is returned to step S52 or S53 in FIG. 16. The subsequent steps are then carried out.

Figure 18:
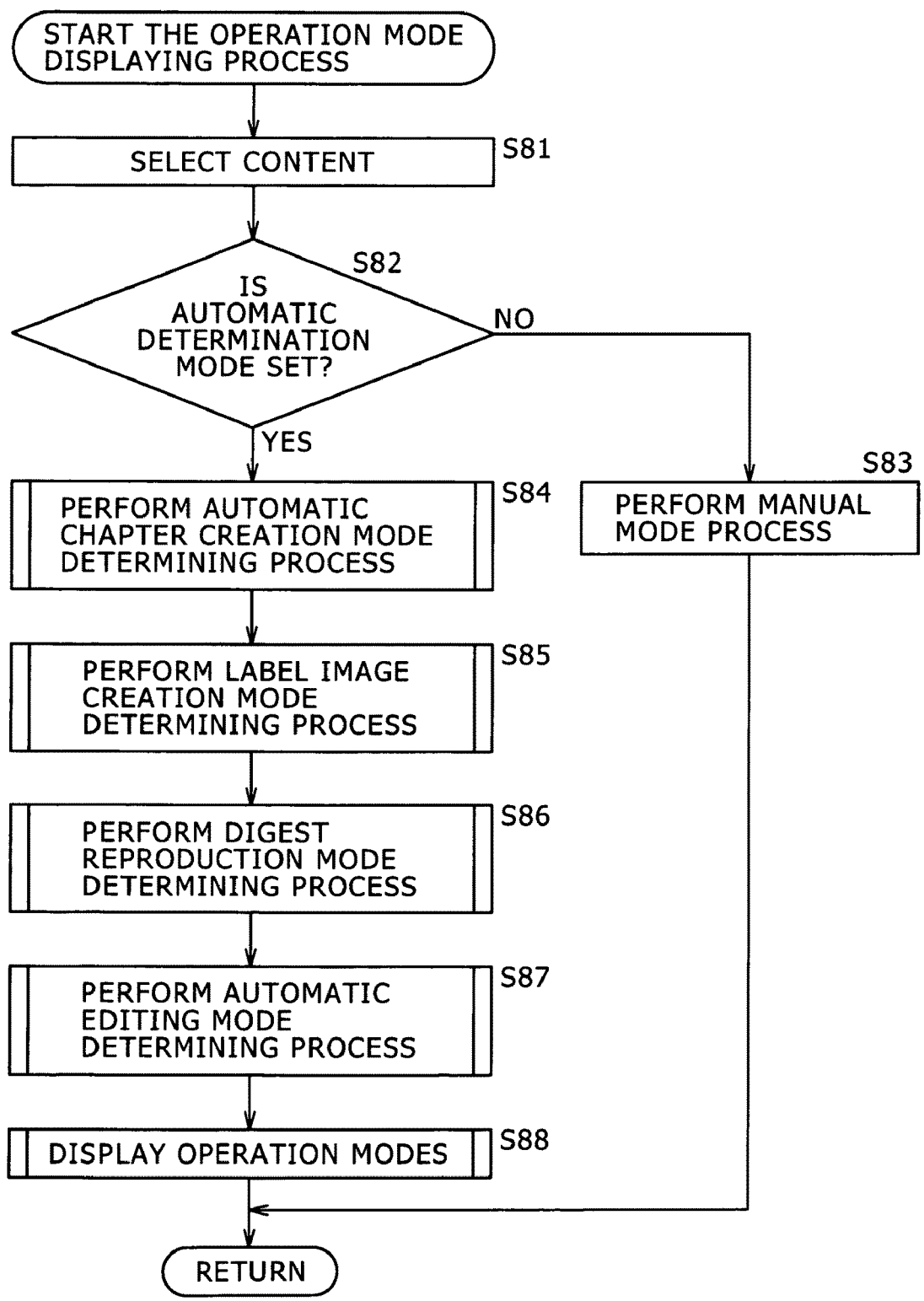
FIG. 18 is a flowchart of steps constituting an operation mode displaying process performed in step S54 of FIG. 16.

Described below in reference to the flowchart of FIG. 18 is the operation mode displaying process performed in step S54 of FIG. 16.

In step S81, the operation mode determination section 37 chooses the user-selected content as the content to be processed.

In step S82, the operation mode determination section 37 determines whether or not there is established an automatic determination mode in which selectable operation modes are automatically chosen and presented to the user.

If in step S82 the automatic determination mode is not found to be set, then step S83 is reached. In step S83, a manual mode is executed. In the manual mode, for example, all operation modes are displayed in list form for the user to choose from. The user may select any one of the listed operation modes. If the selected operation mode is found to be executable, then the mode is carried out; if the selected operation mode is not found executable, then the execution of that mode will not take place.

If in step S82 the automatic determination mode is found to be set, then the operation mode determination section 37 proceeds to determine successively whether each of the operation modes made available is executable.

More specifically, in step S84, the operation mode determination section 37 performs an automatic chapter creation mode determining process to determine whether the automatic chapter creation mode can be executed regarding the currently selected content. In step S85, the operation mode determination section 37 carries out label image creation mode determining process to determine whether the label image creation mode can be executed regarding the currently selected content.

In step S86, the operation mode determination section 37 conducts a digest reproduction mode determining process to determine whether or not the digest reproduction mode can be executed regarding the currently selected content. In step S87, the operation mode determination section 37 performs an automatic editing mode determining process to determine whether or not the automatic editing mode can be executed regarding the currently selected content. The determining processes to be carried out in steps S84 through S87 will be discussed later in reference to the flowchart of FIG. 20.

In the example of FIG. 18, checks are made to determine whether or not each of four operation modes, i.e., automatic chapter creation mode, label image creation mode, digest reproduction mode and automatic editing mode, can be executed. If more operation modes are made available, then further determination whether or not each of these modes is executable can be made successively.

In step S88, the operation mode determination section 37 displays the screen such as one shown in FIG. 2, indicating the operation modes that are found to be executable. When the user selects one of the executable operation modes being displayed, the selected operation mode is executed by the operation mode execution section 34 for processing.

After the screen is displayed in step S88 or after the manual mode is executed in step S83, control is returned to step S54 of FIG. 16. The operation mode displaying process is then brought to an end.

FIGS. 19A, 19B, 19C and 19D are schematic views showing typical displays of an operation mode.

Figure 19A:
FIGS. 19A, 19B, 19C and 19D are schematic views showing typical displays of an operation mode.

FIG. 19A indicates the button displayed when, say, the automatic chapter creation mode is found to be executable. FIG. 19D illustrates the button displayed when the automatic chapter creation mode is not found executable. When an operation mode is found executable, its button is clearly displayed; if the operation mode is not found executable, then its button is grayed out.

Incidentally, in what manner the operation mode of interest can be executed may be indicated by a varied display of its button. For example, if there exist a large number of chapters that can be set based on the analyzed features, then the button such as one shown in FIG. 19B may be displayed. If there are a small number of chapters that can be established, then the button such as one shown in FIG. 19C may be displayed.

Figure 19B:
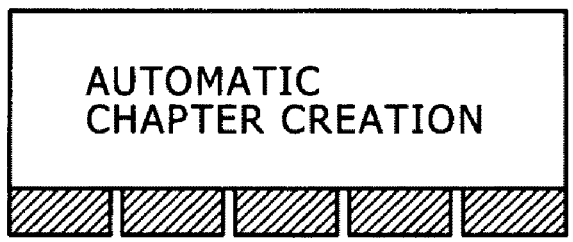
Figure 19C:
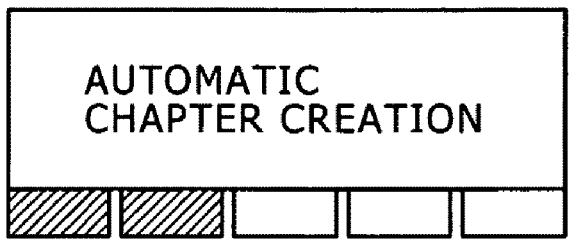
Figure 19D:

In the example of FIG. 19B, all five rectangular tabs under the button are highlighted. In the example of FIG. 19C, only two out of the five rectangular tabs under the button are highlighted.

Figure 20:
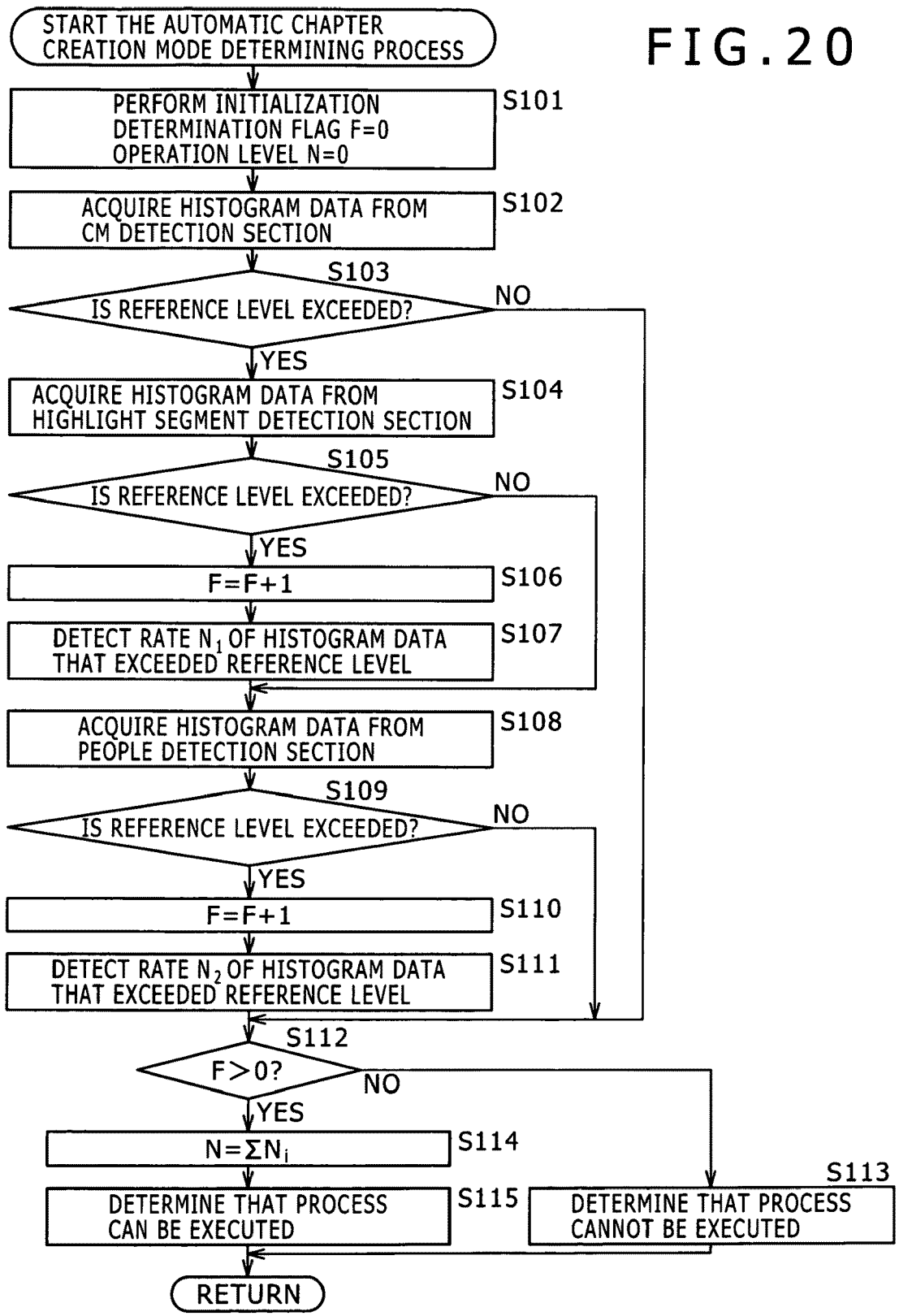
FIG. 20 is a flowchart of steps constituting determining processes performed in steps S84 through S87 of FIG. 18.

The automatic chapter creation determining process in step S84 of FIG. 18 will now be described by referring to the flowchart of FIG. 20.

Although what follows is a description of the detailed steps constituting only the process in step S84, the same steps also apply to the processes in steps S85 through S87.

In step S101, the operation mode determination section 37 initializes a determination flag F and an operation level N to zero each.

In step S102, the operation mode determination section 37 acquires histogram data from the CM detection section 33A of the high-level feature detection section 33 as results of feature detection.

Below is a description of the histogram data representative of the detected results from the high-level feature detection section 33.

Figure 21:
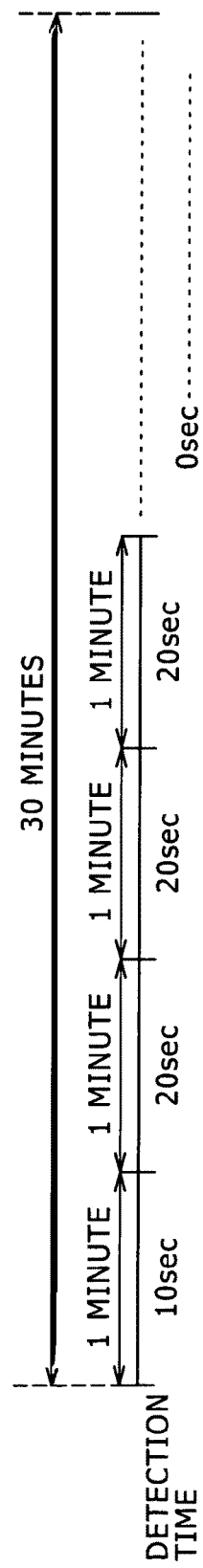
FIG. 21 is a schematic view showing typical results of feature detection.

FIG. 21 is a schematic view showing typical results of feature detection by the similar image detection section 33B of the high-level feature detection section 33.

In the example FIG. 21, similar images are assumed to be detected from a 30-minute content. From the first one-minute video segment, a 10-second segment with continuous similar image is detected. From the next one-minute video segment, a 20-second segment with continuous similar images is detected. From each of the ensuing two one-minute video segments, a 20-second segment with continuous similar images is detected. Thereafter, no segment with continuous similar images is detected.

Figure 22:
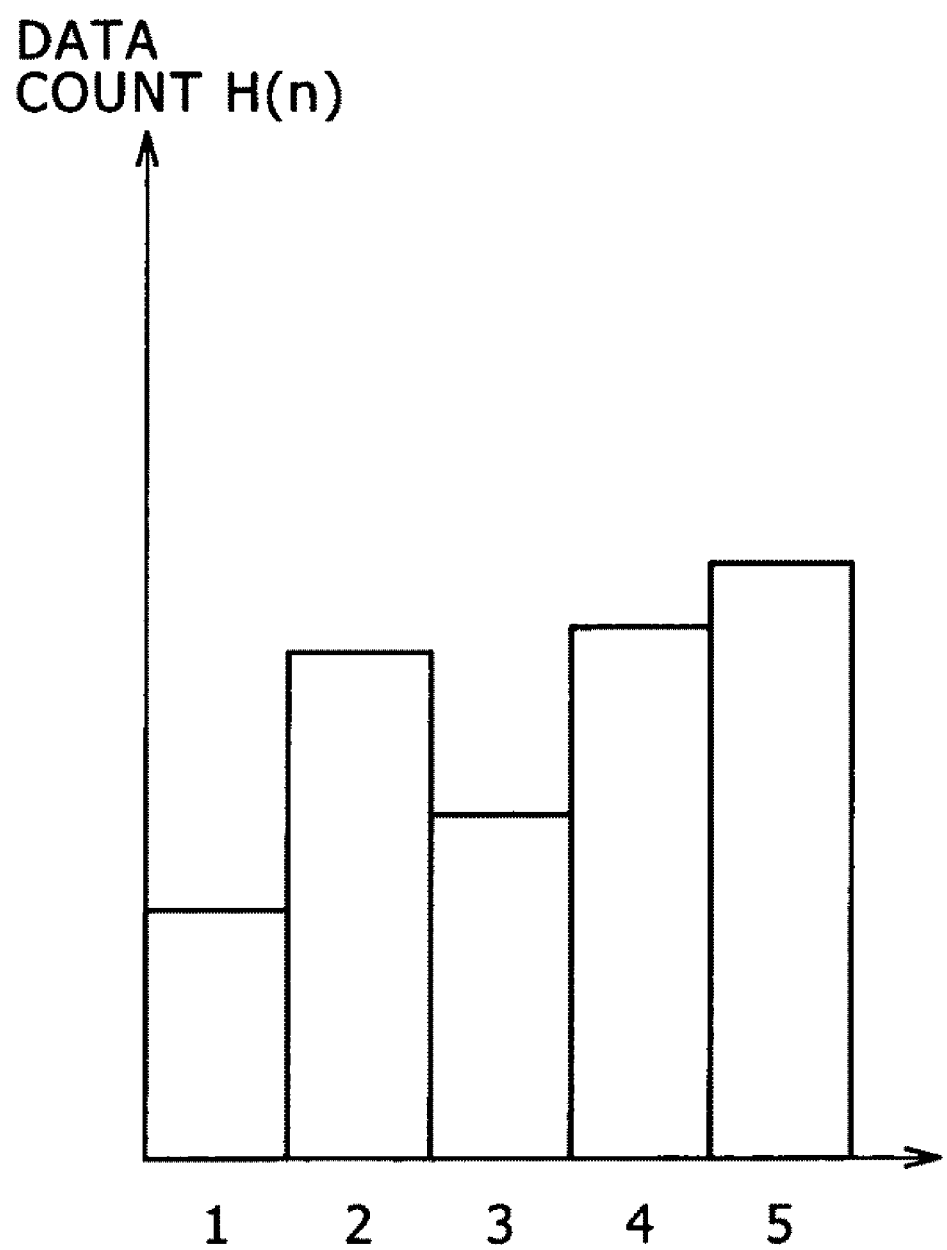
FIG. 22 is a schematic view showing a typical histogram.

The detected results from the above example are represented graphically by histogram data in FIG. 22. The results are output by the component segments of the high-level feature detection section 33. In FIG. 22, the horizontal axis stands for histogram levels and the vertical axis for the number of data items.

FIG. 23 is a tabular view listing what is typically represented by the histogram data output by the component sections of the high-level feature detection section 33.

The histogram data output by the CM detection section 33A denotes the number of CM's detected over a predetermined time period (e.g., 5 minutes). The histogram data output by the similar image detection section 33B represents the number of frames or the length of time in which similar images continued over a predetermined time period (e.g., 1 minute).

The histogram data output by the face detection section 33C indicates the number of frames or the length of time in which faces were continuously detected over a predetermined time period (e.g., 1 minute). The histogram data output by the highlight segment detection section 33D stands for the length of time in which a highlight segment was detected over a predetermined time period (e.g., 1 minute). The histogram data output by the people detection section 33F denotes the number of frames or the length of time in which faces were continuously detected over a predetermined time period (e.g., 1 minute). Although not shown in FIG. 23, the histogram data output by the key frame detection section 33E represents the number of key frames detected over a predetermined time period (e.g., 1 minute).

FIG. 24 is a tabular view listing typical histogram levels.

In the example of FIG. 24, the histogram level is assumed to be 1 when the number of CM's detected over the predetermined time period is 0 to 1 (i.e., detected results from the CM detection section 33A); the histogram level is 2 when the number of detected CM's is 2 to 4; the histogram level is 3 when the number of detected CM's is 5 to 7; the histogram level is 4 when the number of detected CM's is 8 to 9; and the histogram level is 5 when the number of detected CM's is 10 or more.

Additionally, the histogram level is assumed to be 1 when the length of time in which similar images were detected continuously over the predetermined time period (as detected results from the similar image detection section 33B) is 0 to 9 seconds; the histogram level is 2 when the length of the similar image detection time is 10 to 19 seconds; the histogram level is 3 when the length of the similar image detection time is 20 to 29 seconds; the histogram level is 4 when the length of the similar image detection time is 30 to 39 seconds; and the histogram level is 5 when the length of the similar image detection time is 40 seconds or more.

In the same manner as with the similar image detection section 33B, histogram levels are set for the length of time in which faces were continuously detected over the predetermined time period (i.e., detected results from the face detection section 33C); for the length of time in which a highlight segment was detected over the predetermined time period (i.e., detected results from the highlight segment detection section 33D); and for the length of time in which people were continuously detected over the predetermined time period (i.e., detected results from the people detection section 33F).

The histogram data output by each of the component sections of the high-level feature detection section 33 is normalized per unit time so that the total number of histogram data will be, say, 100 in order to simplify the system.

For example, as shown in FIG. 25, the histogram data is normalized per hour (60 minutes). If reference character "t" stands for the length of time of the content in question and if reference character h(n) denotes the number of data at a histogram level "n" before normalization, then the number of data H(n) is obtained using the following expression (5):

$$H(n)=100 \cdot k \cdot h(n) \cdot (60/t) \qquad (5)$$

where, "k" represents a normalization constant for each of the component sections involved.

Where each content to be processed is long in time, it tends to have a large number of data to be detected. This would require setting determination criteria for individual contents, rendering the system complex in structure. The normalizing procedure above helps simply the constitution of the system.

Returning to FIG. 20, in step S103, the operation mode determination section 37 determines whether or not there exists data exceeding a predetermined reference level from among the histogram data supplied by the CM detection section 33A. The operation mode determination section 37 is preset with reference levels (e.g., level 3, level 4, etc.) serving as criteria against which to determine whether or not each of various operation modes is found executable.

If in step S103 there is found data exceeding the predetermined reference level, then step S104 is reached. In step S104, the operation mode determination section 37 acquires the histogram data output by the highlight segment detection section 33D of the high-level feature detection section 33.

In step S105, the operation mode determination section 37 determines whether or not there exists data exceeding a predetermined reference level from among the histogram data supplied by the highlight segment detection section 33D.

If in step S105 there is found data exceeding the predetermined reference level, then step S106 is reached. In step S106, the operation mode determination section 37 increments the value of the determination flag F by 1.

In step S107, the operation mode determination section 37 detects a rate $N_1$ of the histogram data exceeding the reference level to the entire histogram data output by the highlight segment detection section 33D.

Step S108 is reached in one of two cases: after the rate $N_1$ is detected in step S107; or if in step S105 there is found no data exceeding the predetermined reference level from among the histogram data supplied by the highlight segment detection section 33D. In step S108, the operation mode determination section 37 acquires the histogram data output by the people detection section 33F of the high-level feature detection section 33.

In step S109, the operation mode determination section 37 determines whether or not there exists data exceeding a predetermined level from among the histogram data supplied by the people detection section 33F.

If in step S109 there is found data exceeding the predetermined reference level, then step S110 is reached. In step S110, the operation mode determination section 37 increments the value of the determination flag F by 1.

In step S111, the operation mode determination section 37 detects a rate $N_2$ of the histogram data exceeding the reference level to the entire histogram data output by the people detection section 33F of the high-level feature detection section 33.

Step S112 is reached in one of three cases: after the rate $N_2$ is detected in step S111; if in step S109 there is found no data exceeding the predetermined reference level from among the histogram data supplied by the people detection section 33F; or if in step S103 there is found no data exceeding the predetermined reference level from among the histogram data supplied by the CM detection section 33A. In step S112, the operation mode determination section 37 determines whether or not the value of the determination flag F is larger than zero.

If in step S112 the value of the determination flag F is not found to be larger than zero, then step S113 is reached. In step S113, the operation mode determination section 37 determines that the automatic chapter creation mode is not executable.

If in step S112 the value of the determination flag F is found to be larger than zero, then step S114 is reached. In step S114, the operation mode determination section 37 adds up $N_1$ and $N_2$ and sets the sum as the value of the operation level N.

In step S115, the operation mode determination section 37 determines that the automatic chapter creation mode is executable.

FIG. 26 is a tabular view listing operation mode criteria. In the example of FIG. 26, a highlight chapter function of the automatic chapter creation mode is found to be executable if three criteria are met: 70 percent or less of all histogram data output by the CM detection section 33A should have at least histogram level 3; at least 30 percent of all histogram data output by the highlight segment detection section 33D should have at least histogram level 3; and at least 30 percent of all histogram data output by the people detection section 33F should have at least histogram level 4.

Likewise, a key frame image label function of the label image creation mode is found executable if three criteria are met: 70 percent or less of all histogram data output by the CM detection section 33A should have at least histogram level 3; at least 30 percent of all histogram data output by the face detection section 33C should have at least histogram level 4; and at least 30 percent of all histogram data output by the highlight segment detection section 33D should have at least histogram level 3.

The other operation modes are also subject to their corresponding criteria. Checks are made to determine whether or not each of the operation modes is executable given the relevant criteria to be met.

By carrying out the process described above, the signal processing apparatus 1 automatically determines executable operation modes and presents them to the user.

In turn, the user can choose from the operation modes that are reliably executable, which enhances the efficiency of the user's operations as well as his or her convenience.

Because the signal processing apparatus 1 processes signals in the above-described layered network structure, effective signals are channeled efficiently to relevant sections of the apparatus.

Illustratively, upon detection of fade segments, this type of segments is known to have few detectable image edges with little correlation to brightness or color features. This makes it possible to divert all irrelevant signals manifesting such features away from the process of detecting fade segments.

FIGS. 27 through 34 are schematic views showing typical detected results of features.

Each of FIGS. 27 through 34 shows, from the top down, video segments to be processed, detected results from the CM detection section 33A regarding segments including such video segments, detected results from the similar image detection section 33B regarding the same segments, detected results from the face detection section 33C regarding the same segments, detected results from the highlight segment detection section 33D regarding the same segments, and detected results from the people detection section 33F regarding the same segments. In a graphic representation showing the detected results from each of the component sections of the high-level feature detection section 33, the horizontal axis stands for time and the vertical axis for detected levels. Shown on the right-hand side of each graphic representation is a display of detected histogram data after normalization.

Figure 27:
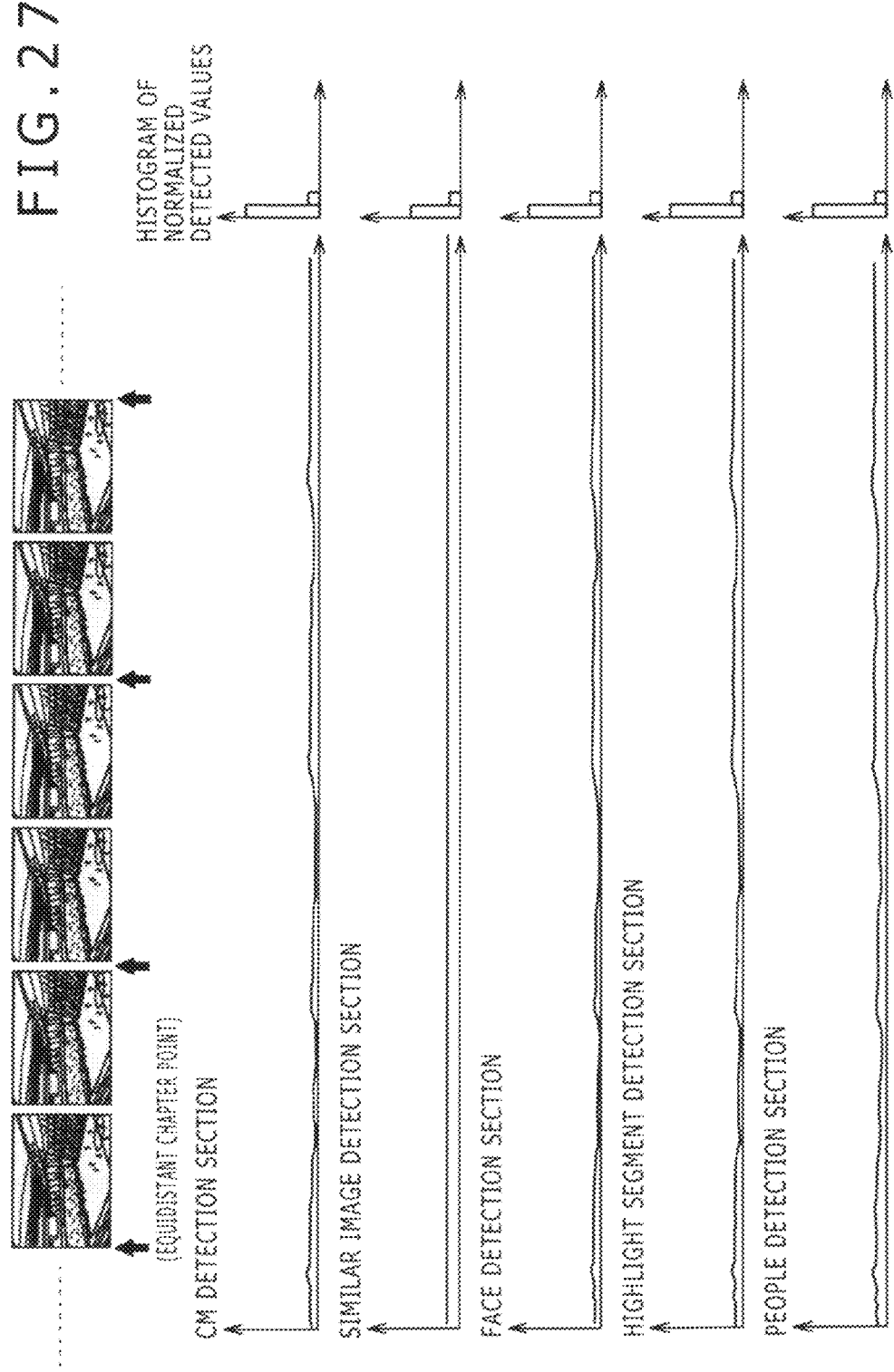
FIG. 27 is a schematic view showing typical detected results of features.

As shown in FIG. 27, if the content to be processed is made up of only segments in which no scene highlights are detected, then it is determined that the automatic chapter creation mode is executable only in connection with the function of setting chapter points at intervals of an equal distance. Where the automatic chapter creation mode is selected in conjunction with this function, chapter points are established at regular intervals.

If, as shown in FIG. 28, the content to be processed is made up of segments including one in which a scene highlight is detected, then it is determined that the automatic chapter creation mode is also executable in conjunction with the function of setting chapter points pointing to the highlight. Where the automatic chapter creation mode is selected in conjunction with this function, chapter points are established at the beginning and the end of the highlight segment.

In the example of FIG. 28 chapter points $C_1$ and $C_2$ are set as indicated. Whether or not the automatic chapter creation mode is executable is determined based on the normalized histogram data, while the positions in which to establish chapter points are determined on the basis of the detected results from the component sections of the high-level feature detection section 33.

If, as shown in FIG. 29, the content to be processed is made up of segments in which the absence of any scene highlight renders key frames undetectable, then it is determined that the label image creation mode is not executable in conjunction with the function of automatically creating a label image containing a key frame image. In this case, the first frame $F_1$ in the recording start position is managed as a representative image.

If, as shown in FIG. 30, the content to be processed is made up of segments including one in which similar images are detected, then it is determined that the label image creation mode is executable in conjunction with the function of automatically creating a label image containing a key frame image. Where the label image creation mode is selected, a frame $F_2$ in the starting position of the similar image segment is selected as a key frame, and a label image containing the image of the frame $F_2$ is created.

If, as shown in FIG. 31, the content to be processed contains no similar image segment and has no key frame detected therefrom, then it is determined that the digest reproduction mode is executable only in conjunction with the function of simply skip-reproducing the content at predetermined intervals. Where the digest reproduction mode is selected in conjunction with this function, segments are reproduced simply at intervals of a predetermined time period as indicated by arrowed solid lines in FIG. 31.

If, as shown in FIG. 32, the content to be reproduced contains segments including one in which similar images are detected, then it is determined that the digest reproduction mode is also executable in connection with the function of reproducing solely the similar image segment in digest form. Where the digest reproduction mode is selected in conjunction with this function, only the similar image segment is reproduced as indicated by an arrowed solid line in FIG. 32.

If, as shown in FIG. 33, the content to be processed is solely made up of segments in which no scene highlight is detected, then it is determined that the automatic editing mode is not executable. In that case, editing work is done manually by the user.

If, as shown in FIG. 34, the content to be reproduced is made up of segments including one in which a scene highlight is detected, then it is determined that the automatic editing mode is executable. Where the automatic editing mode is selected, two segments may be extracted illustratively for editing: the highlight segment indicated by an arrowed solid line in FIG. 34, and a segment Ts separated by a predetermined time period from the highlight segment.

In the foregoing description, the processing sections constituting the layered network structure were shown to carry out signal processing. However, this is not limitative of the present invention. Alternatively, as shown in FIG. 35, processing sections making up a neural network structure may be implemented to process signals.

In the example of FIG. 35, the detected results from the component sections of the intermediate-level feature detection section 32 are input for signal processing. The results of the signal processing are input to the downstream sections that determine whether or not each of diverse operation modes is executable.

In the foregoing explanation, the selectable operation modes were shown to be presented visually to the user through screen display. Alternatively, the selectable operation modes may be presented audibly to the user.

The series of steps and processes described above may be executed either by hardware or by software. Where the software-based processing is to be carried out, the programs constituting the software may be either incorporated beforehand in dedicated hardware of a computer for program execution or installed upon use into a general-purpose personal computer or like equipment capable of executing diverse functions based on the installed programs.

The programs to be installed in and executed by the computer are typically offered to the user recorded on the removable media 22 (shown in FIG. 3) serving as package media such as magnetic disks (including flexible disks), optical disks (including CD-ROM (compact disc read-only memory) and DVD (digital versatile disc)), magneto-optical disks, or semiconductor memory. The programs may also be offered to the user via wired or wireless communication media such as local area networks, the Internet, or digital satellite broadcasting networks. The programs may alternatively be installed in the ROM 12 or in the recording device 19 beforehand.

In this specification, the programs for execution by the computer may be carried out in the depicted sequence (i.e., on a time series basis), in parallel fashion, or individually when they are invoked as needed.

It should be understood by those skilled in the art that various modifications, combinations, sub-combinations and alterations may occur depending on design requirements and other factor in so far as they are within the scope of the appended claims or the equivalents thereof.

What is claimed is:

1. A signal processing apparatus comprising:
    first feature detection means for detecting a plurality of first feature data each representing a different feature from video and audio signals of a content;
    setting means for setting a weight for each of said plurality of first feature data detected by said first feature detection means, said weight corresponding to the feature for detecting data on the basis of said first feature data, said weight being varied either from one content to another or from one content genre to another; and
    second feature detection means for detecting a plurality of second feature data each representing a different feature on the basis of said plurality of first feature data for which the weights have been set by said setting means.

2. The signal processing apparatus according to claim 1, further comprising:
    presentation means for presenting a user with operations to allow choosing from regarding said content on the basis of said plurality of second feature data detected by said second feature detection means; and
    execution means for executing the operation selected by said user from among said operations presented by said presentation means.

3. The signal processing apparatus according to claim 2, wherein said presentation means presents said operations to choose from using either screen display or audio output.

4. The signal processing apparatus according to claim 1, wherein said first feature detection means includes a plurality of processing sections configured individually to detect said first feature data on the basis of the audio signal and a plurality of processing sections configured individually to detect said first feature data on the basis of the video signal, said individual processing sections detecting said first feature data; and said second feature detection means includes a plurality of processing sections configured individually to detect said second feature data.

5. A signal processing method comprising the steps of:

detecting a plurality of first feature data each representing a different feature from video and audio signals of a content;

setting a weight for each of the detected plurality of first feature data, said weight corresponding to the feature for detecting data on the basis of said first feature data, said weight being varied either from one content to another or from one content genre to another; and detecting a plurality of second feature data each representing a different feature on the basis of said plurality of first feature data for which the weights have been set.

6. A non-transitory recording medium on which is recorded a program for causing a computer to execute a procedure comprising the steps of:

detecting a plurality of first feature data each representing a different feature from video and audio signals of a content;

setting a weight for each of the detected plurality of first feature data, said weight corresponding to the feature for detecting data on the basis of said first feature data, said weight being varied either from one content to another or from one content genre to another; and detecting a plurality of second feature data each representing a different feature on the basis of said plurality of first feature data for which the weights have been set.

7. A signal processing apparatus comprising:

a first feature detection unit configured to detect a plurality of first feature data each representing a different feature from video and audio signals of a content;

a setting unit configured to set a weight for each of said plurality of first feature data detected by said first feature detection unit, said weight corresponding to the feature for detecting data on the basis of said first feature data, said weight being varied either from one content to another or from one content genre to another; and a second feature detection unit configured to detect a plurality of second feature data each representing a different feature on the basis of said plurality of first feature data for which the weights have been set by said setting unit.

* * * * *